United States Patent
Stone et al.

(10) Patent No.: US 6,804,686 B1
(45) Date of Patent: Oct. 12, 2004

(54) SYSTEM AND METHODOLOGY FOR PROVIDING FIXED UML LAYOUT FOR AN OBJECT ORIENTED CLASS BROWSER

(75) Inventors: Blake W. Stone, Aptos, CA (US); William C. Joy, Santa Cruz, CA (US); Christian K. Kemper, Santa Cruz, CA (US)

(73) Assignee: Borland Software Corporation, Scotts Valley, CA (US)

( * ) Notice: Subject to any disclaimer, the term of this patent is extended or adjusted under 35 U.S.C. 154(b) by 245 days.

(21) Appl. No.: 10/241,622

(22) Filed: Sep. 10, 2002

Related U.S. Application Data

(60) Provisional application No. 60/376,485, filed on Apr. 29, 2002.

(51) Int. Cl.$^7$ ............................................... G06F 17/30
(52) U.S. Cl. ........................................ 707/104.1; 707/1
(58) Field of Search ............................... 707/4, 10, 100, 707/101, 102, 104.1; 345/764; 700/95; 743/189, 200, 201; 717/102, 107, 101, 113, 114, 115, 122, 121, 126, 143, 104

(56) References Cited

U.S. PATENT DOCUMENTS

| | | | |
|---|---|---|---|
| 6,199,195 B1 * | 3/2001 | Goodwin et al. | 717/104 |
| 6,237,135 B1 * | 5/2001 | Timbol | 717/107 |
| 6,247,020 B1 * | 6/2001 | Minard | 707/104.1 |
| 6,321,378 B1 * | 11/2001 | Weber | 717/122 |
| 6,681,383 B1 * | 1/2004 | Pastor et al. | 717/126 |
| 6,718,218 B1 * | 4/2004 | Matheson | 700/95 |

* cited by examiner

*Primary Examiner*—Diane D. Mizrahi
*Assistant Examiner*—Apu Mofiz
(74) *Attorney, Agent, or Firm*—John A. Smart; G. Mack Riddle

(57) ABSTRACT

A system and methodology for providing a Unified Modeling Language (UML) diagram of a program for display in a graphical user interface of a development system is described. Relationships between a plurality of files of a program are determined using a compiler. When a request for display of a UML diagram is received, a UML diagram of the currently selected file is generated based upon the determined relationships between the currently selected file and other files of the program. The UML diagram displayed in the graphical user interface enables a user to navigate to a particular file of the program by selecting one of the nodes of the UML diagram. The system enables a user to view source code or a UML diagram of a particular component displayed in the UML diagram.

49 Claims, 14 Drawing Sheets

SYSTEM AND METHODOLOGY FOR PROVIDING FIXED UML LAYOUT FOR AN OBJECT ORIENTED CLASS BROWSER

RELATED APPLICATIONS

The present application is related to and claims the benefit of priority of the following commonly-owned provisional application(s): application Ser. No. 60/376,485, filed Apr. 29, 2002, entitled "System and Methodology for Providing Fixed UML Layout for an Object Oriented Class Browser", of which the present application is a non-provisional application thereof. The present application is related to the following commonly-owned application(s); pending application Ser. No. 10/209,283, filed Jul. 30, 2002, entitled "System and Methodology Providing Compiler-Assisted Refactoring". The disclosures of each of the foregoing applications are hereby incorporated by reference in their entirety, including any appendices or attachments thereof, for all purposes.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to a system providing methods for facilitating development and maintenance of software applications or systems, with particular emphasis on providing a fixed Unified Modeling Language (UML) layout for an object oriented class browser.

2. Description of the Background Art

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks. While it is possible for humans to compose meaningful programs in machine code, practically all software development today employs one or more of the available programming languages. The most widely used programming languages are the "high-level" languages, such C, Pascal, or more recently Java. These languages allow data structures and algorithms to be expressed in a style of writing that is easily read and understood by fellow programmers.

A program called a "compiler" translates these instructions into the requisite machine language. In the context of this translation, the program written in the high-level language is called the "source code" or source program. The ultimate output of the compiler is a compiled module such as a compiled C "object module," which includes instructions for execution ultimately by a target processor, or a compiled Java class, which includes bytecodes for execution ultimately by a Java virtual machine. A Java compiler generates platform-neutral "bytecodes"—an architecturally neutral, intermediate format designed for deploying application code efficiently to multiple platforms.

Java bytecodes are designed to be easy to interpret on any machine. Bytecodes are essentially high-level, machine-independent instructions for a hypothetical or "virtual" machine that is implemented by the Java interpreter and runtime system. The virtual machine, which is actually a specification of an abstract machine for which a Java language compiler generates bytecode, must be available for the various hardware/software platforms which an application is to run. The Java interpreter executes Java bytecode directly on any machine for which the interpreter and runtime system of Java have been ported. In this manner, the same Java language bytecode runs on any platform supported by Java.

Conventionally, creation of a software program or system includes creation of individual source code modules. This approach simplifies program development by dividing functionality available in the program into separate source modules. When multiple source modules are employed for creating a program, interdependencies between the individual modules often exist. Program logic in one module can, for instance, reference variables, methods, objects, and symbols imported from another module. By the very same token, that module can also export its own methods, objects, and symbols, making them available for use by other modules.

"Visual" development environments, such as Borland's JBuilder®, are the preferred application development environments for quickly creating production applications. Such environments are characterized by an integrated development environment (IDE) providing a form painter, a property getter/setter manager ("inspector"), a project manager, a tool palette (with objects which the user can drag and drop on forms), an editor, and a compiler. In general operation, the user "paints" objects on one or more forms, using the form painter. Attributes and properties of the objects on the forms can be modified using the property manager or inspector. In conjunction with this operation, the user attaches or associates program code with particular objects on screen (e.g., button object); the editor is used to edit program code which has been attached to particular objects. After the program code has been developed, the compiler is used to generate binary code (e.g., Java bytecode) for execution on a machine (e.g., a Java virtual machine).

Although visual development environments enable applications to be created quickly, problems remain with the development, implementation, and maintenance of software applications. In an object oriented development environment, software applications are developed as a set of objects and classes that interact with one another. It is difficult for developers to use those objects and classes unless they fully understand the relationships between them. For example, to change the name of a method in a Java application a developer has to find all classes that invoke the method, so that the invocations of the method are updated accordingly. All told, application developers and other users are required to understand complex relationships between components of software systems in order to develop, implement, and maintain such systems.

In order to better understand the relationships between objects and their classes a number of current development tools provide a class browser which allows navigating between the individual classes of a software system or application. However, a class browser usually displays only the inheritance relationships between classes, which is only one of several relationships that exist between classes. Current class browsers do not provide higher level diagrams that enable developers to understand all of the complex relationships between classes of a system.

A current technology for understanding complex object oriented software systems is the Unified Modeling Language (UML). UML is a standard graphical language for modeling object-oriented systems. For further information on UML, see e.g., "OMG Unified Modeling Language Specification (Version 1.4, September 2001)" available from the Object Management Group, Inc., the disclosure of which is hereby incorporated by reference. A copy of this specification is currently available via the Internet at www.omg.org. UML, at its simplest, is a language that graphically describes a set of elements. At its most complex, UML is used to specify, visualize, construct, and document not only software systems but also business models and non-software systems. Much like a blueprint for constructing a building, UML provides a graphical representation of a system design that may be used by developers to assure architectural soundness of a system. UML is frequently used to design the relationships between components (e.g., classes in the case of a Java program) before such components are developed and implemented in source code format.

A number of UML design tools are available for use in conjunction with the design and development of a software system. However, these current UML design tools are focused on system design and are not integrated with a class browser. Typically a developer uses a UML design tool for system design, but uses a separate development tool for developing the source code modules necessary to implement the system from the design. Because the UML design tools and development tools are not integrated, the UML diagrams are not updated to reflect the actual design of the system as implemented. In addition, current UML tools do not provide easy access to the underlying source code of the system during the development process or after the system is implemented.

Some current tools provide functionality for "reverse engineering" (i.e., generating) UML diagrams from given a set of source code files (e.g., Java source files). However, these tools typically require the source code to be read in and parsed in response to a request to generate a UML diagram of a particular program. They do not provide immediate access to the UML diagrams of the program. Another limitation of this approach is that the tools are not integrated with a class browser to provide a developer with the ability to easily navigate from a UML diagram to the associated source code of a software system (and vice versa).

An integrated solution is needed that enables developers to better utilize UML diagrams in designing, developing, and maintaining complex software systems. The solution should provide UML diagrams of implemented systems together with the ability to easily access the underlying source code of such systems, preferably using a class browser to facilitate such access. The present invention fulfills these and other needs.

GLOSSARY

The following definitions are offered for purposes of illustration, not limitation, in order to assist with understanding the discussion that follows.

Bytecode: A virtual machine executes virtual machine low-level code instructions called "bytecodes." Both the Sun Microsystems Java virtual machine and the Microsoft-.NET virtual machine provide a compiler to transform the respective source program (i.e., a Java program or a C# program, respectively) into virtual machine bytecodes.

Compiler: A compiler is a program which translates source code into binary code to be executed by a computer. The compiler derives its name from the way it works, looking at the entire piece of source code and collecting and reorganizing the instructions. Thus, a compiler differs from an interpreter which analyzes and executes each line of code in succession, without looking at the entire program. A Java compiler translates source code written in the Java programming language into bytecode for the Java virtual machine.

Interpreter: An interpreter is a module that alternately decodes and executes every statement in some body of code. A Java runtime interpreter decodes and executes bytecode for the Java virtual machine.

Java: Java is a general purpose programming language developed by Sun Microsystems. Java is an object-oriented language similar to C++, but simplified to eliminate language features that cause common programming errors. Java source code files (files with a .java extension) are compiled into a format called bytecode (files with a .class extension), which can then be executed by a Java interpreter. Compiled Java code can run on most computers because Java interpreters and runtime environments, known as Java virtual machines (VMs), exist for most operating systems, including UNIX, the Macintosh OS, and Windows. Bytecode can also be converted directly into machine language instructions by a just-in-time (JIT) compiler. Further description of the Java Language environment can be found in the technical, trade, and patent literature; see e.g., Gosling, J. et al., "The Java Language Environment: A White Paper," Sun Microsystems Computer Company, October 1995, the disclosure of which is hereby incorporated by reference.

UML: UML standards for the Unified Modeling Language, a standard graphical language for modeling object-oriented systems. For further information on UML, see e.g., "OMG Unified Modeling Language Specification (Version 1.4, September 2001)" available from the Object Management Group, Inc., the disclosure of which is hereby incorporated by reference. A copy of this specification is currently available via the Internet at www.omg.org.

SUMMARY OF THE INVENTION

A method for generating a Unified Modeling Language (UML) diagram of a program for display in a graphical user interface of a development system is described. Relationships between a plurality of files of a program are determined using a compiler. When a request for display of a Unified Modeling Language (UML) diagram is received from a user, the file currently displayed (or selected) in the graphical user interface is automatically determined. A UML diagram of the currently selected file is generated based upon the determined relationships between files of the program. The UML diagram comprises a hierarchical view of relationships between the selected file and other files of the program having a plurality of nodes. The UML diagram displayed in the graphical user interface enables a user to navigate to a particular file of the program by selecting one of the nodes of the UML diagram.

The system for displaying UML diagrams of software programs includes a compiler, a manager module, and a browser interface. The compiler compiles a software program containing a plurality of objects and generates information regarding relationships amongst the plurality of objects in the program. The manager module receives requests for a display of a UML diagram of a particular object and generates a diagram of relationships between this particular object and other objects of the program based upon the relationship information generated by the compiler. The diagram is generated by the manager module using Unified Modeling Language (UML) notation. The browser interface displays the generated UML diagram and enables a user to navigate to either source code or a UML diagram of a particular object displayed in the UML diagram by selecting the object in the browser interface.

DETAILED DESCRIPTION OF A PREFERRED EMBODIMENT

The following description will focus on the presently-preferred embodiment of the present invention, which is implemented in a desktop application operating in an Internet-connected environment running under a desktop operating system, such as the Microsoft® Windows operating system running on an IBM-compatible PC. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation.

I. Computer-based Implementation

A. Basic System Hardware (e.g., For Desktop and Server Computers)

Figure 1:
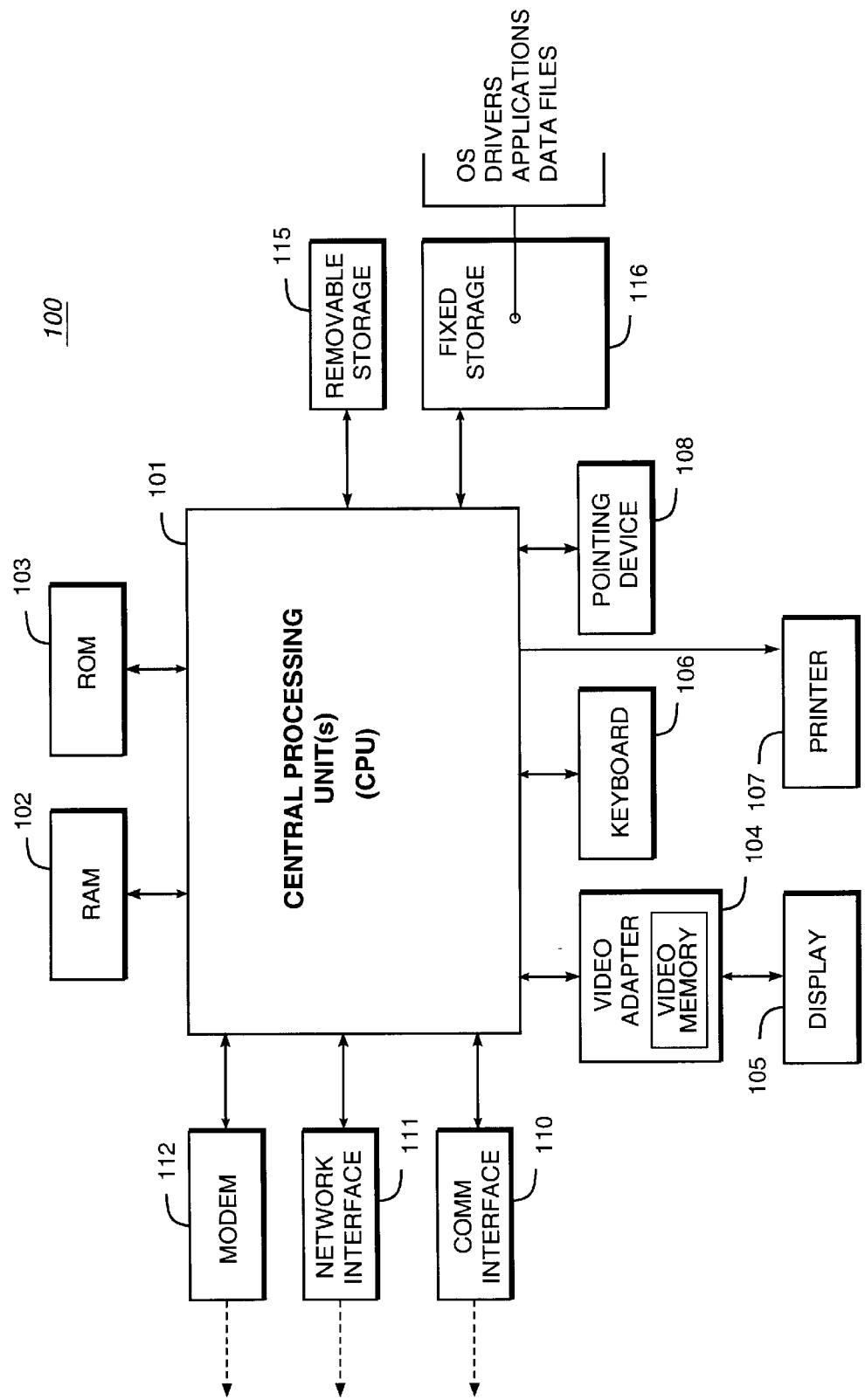
FIG. 1 is a block diagram of a computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic System Software

Figure 2:
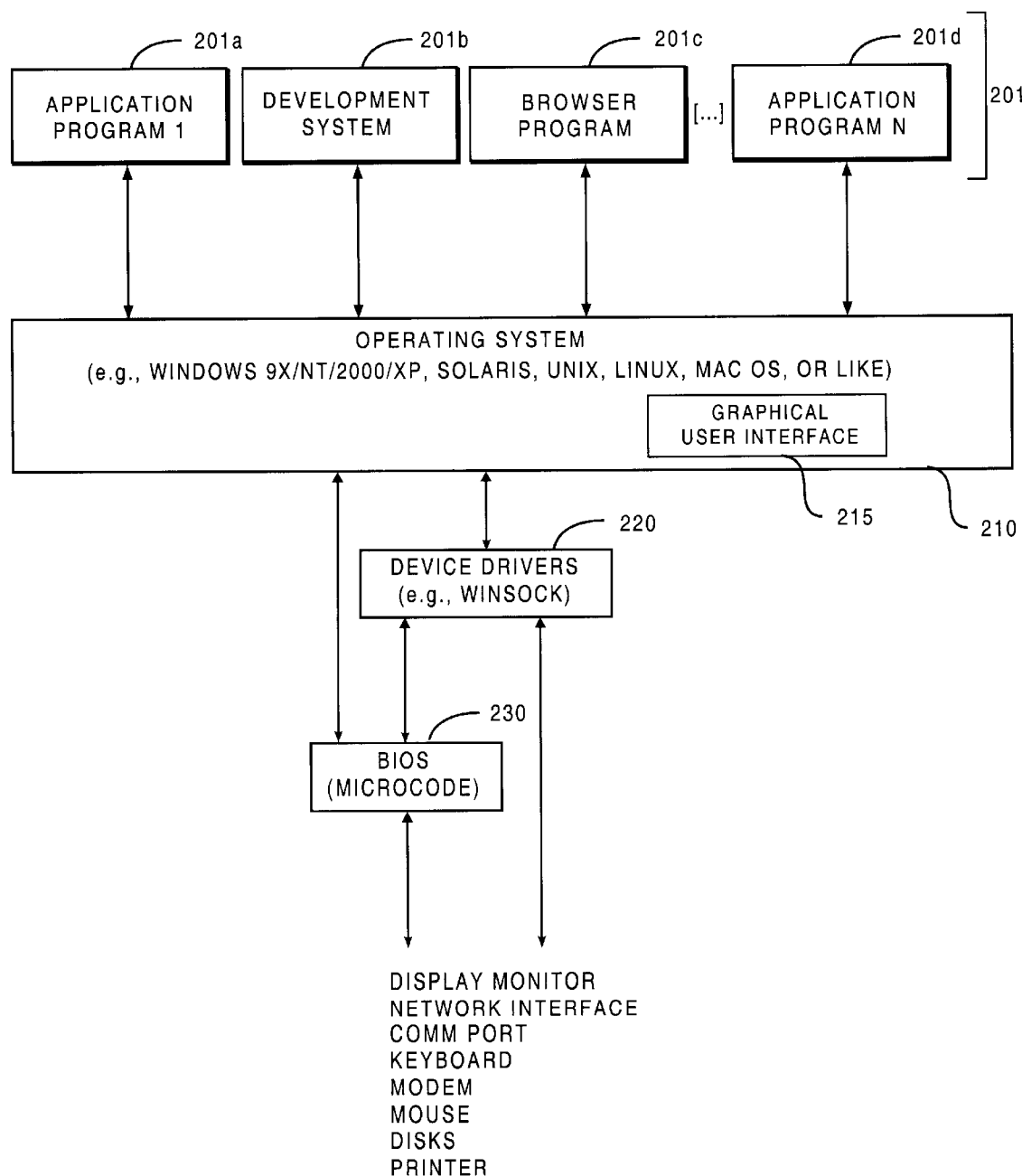
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201*a*, 201*b*, 201*c*, 201*d*) may be "loaded" (i.e., transferred from fixed storage 116 into memory 102) for execution by the system 100.

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously mentioned operating systems.

C. Java Development Environment

Java is a simple, object-oriented language which supports multi-thread processing and garbage collection. Although the language is based on C++, a superset of C, it is much simpler. More importantly, Java programs are "compiled" into a binary format that can be executed on many different platforms without recompilation. A typical Java system comprises the following set of interrelated technologies: a language specification; a compiler for the Java language that produces bytecodes from an abstract, stack-oriented machine; a virtual machine (VM) program that interprets the bytecodes at runtime; a set of class libraries; a runtime environment that includes bytecode verification, multi-threading, and garbage collection; supporting development tools, such as a bytecode disassembler; and a browser (e.g., Sun's "Hot Java" browser).

Figure 3A:
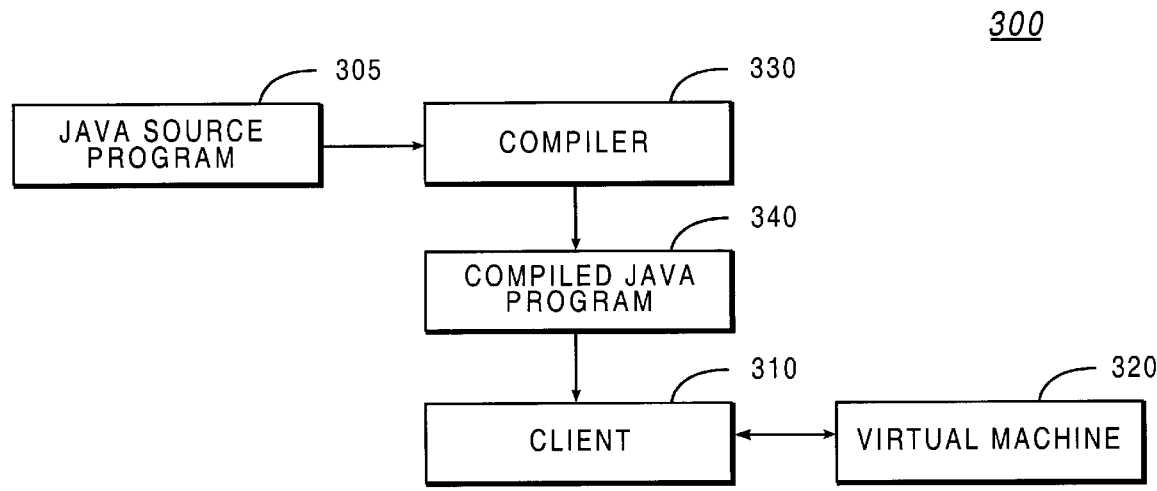
FIG. 3A is a block diagram of a Java development system suitable for implementing the present invention.

Shown in further detail in FIG. 3A, a Java development system 300 suitable for implementing the present invention includes a client 310 which employs a virtual machine 320 for executing programs. In particular, the client 310 executes a "compiled" (i.e., bytecode or pseudo-compiled) Java program 340, which has been created by compiling a Java source code program or script 305 with a Java compiler 330. Here, the Java source code program 305 is an application program written in the Java programming language; the pseudo-compiled program 340, on the other hand, comprises the bytecode emitted by the compiler 330. The virtual machine 320 includes a runtime interpreter for interpreting the Java bytecode program 340. During operation, the client 310 simply requests the virtual machine 320 to execute a particular Java compiled program.

Figure 3B:
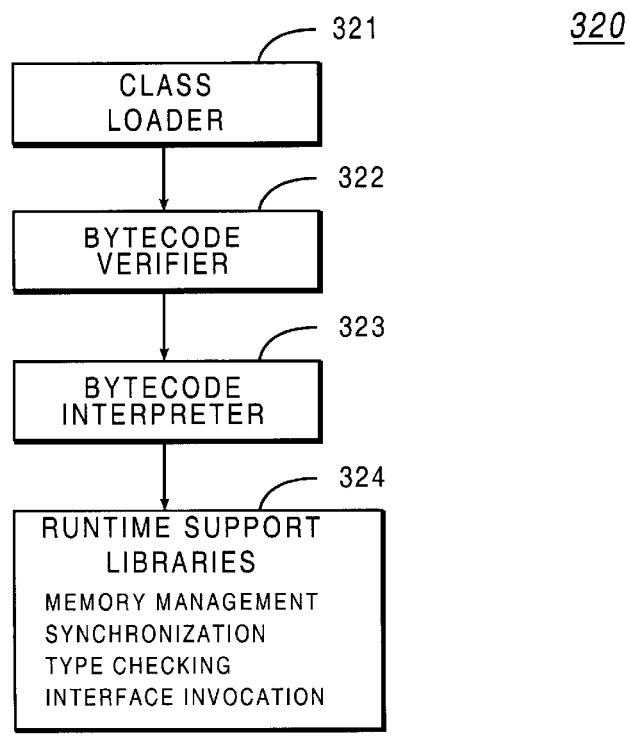
FIG. 3B is a block diagram of a virtual machine illustrated in the Java development system of FIG. 3A.

As shown in FIG. 3B, the virtual machine 320 comprises a class loader 321, a bytecode verifier 322, a bytecode interpreter 323, and runtime support libraries 324. The class loader 321 is responsible for unpacking the class file which has been requested by a client. Specifically, the class loader 321 will unpack different sections of a file and instantiate in-memory corresponding data structures. The class loader will invoke itself recursively for loading any superclasses of the current class which is being unpacked.

The bytecode verifier 322 verifies the bytecode as follows. First, it checks whether the class has the correct access level. Since the class will access other classes for invoking their methods, the bytecode verifier 322 must confirm that appropriate access is in place. Additionally, the bytecode verifier confirms that the bytecode which comprises the methods is not itself corrupt. In this regard, the bytecode verifier confirms that the bytecode does not change the state of the virtual machine (e.g., by manipulating pointers).

Once the bytecode has been verified, a "class initializer" method is executed. It serves, in effect, as a constructor for the class. The initializer is not a constructor in the sense that it is used to construct an instance of a class—an object. The class initializer, in contrast, initializes the static variables of the class. These static variables comprise the variables which are present only once (i.e., only one instance), for all objects of the class.

Runtime support libraries 324 comprise functions (typically, written in C) which provide runtime support to the virtual machine, including memory management, synchronization, type checking, and interface invocation. At the client machine on which a Java application is to be executed, runtime support libraries 324 are included as part of the virtual machine; the libraries are not included as part of the Java application. The bytecode which is executed repeatedly calls into the runtime support libraries 324 for invoking various Java runtime functions.

In the currently preferred embodiment, the Java development system 300 may be provided by Borland JBuilder® 7.0, available from Borland Software Corporation of Scotts Valley, Calif. Further description of the development system 300 may be found in "Building Applications with JBuilder (Version 7)," available from Borland Software Corporation of Scotts Valley, Calif., the disclosure of which is hereby incorporated by reference. The following briefly describes the Java-based visual development interface provided by the system.

D. Development Interface

Figure 4:
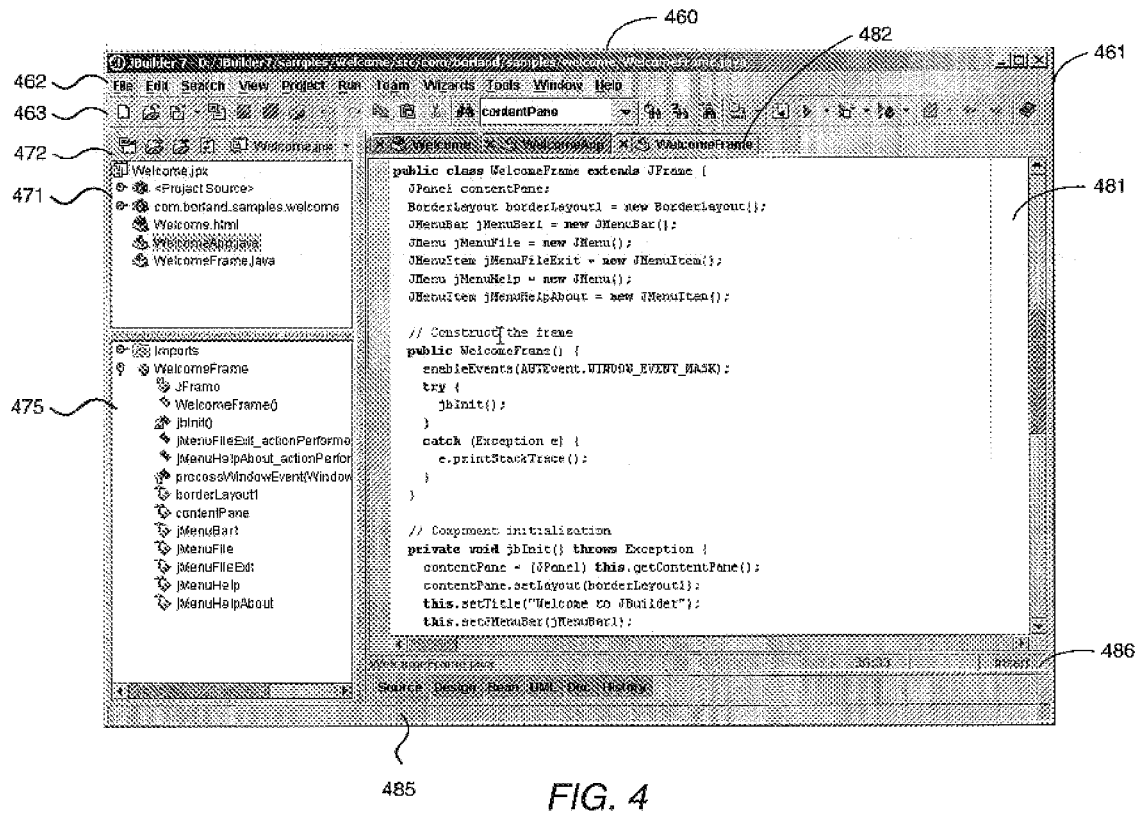
FIG. 4 illustrates a preferred interface of a Java-based visual development or programming environment provided by the Java development system.

FIG. 4 illustrates a preferred interface of a Java-based visual development or programming environment 460 provided by the system. As shown, the programming environment 460 comprises a main window 461, a project pane 471, a structure pane 475, and a content pane 481 (showing the editor). The main window 461 itself includes a main menu 462 and a main toolbar 463. The main menu 462 lists user-selectable commands, in a conventional manner. For instance, the main menu 462 invokes "File", "Edit", "Search", "View" submenus, and the like. Each submenu lists particular choices which the user can select. Working in conjunction with the main menu, the main toolbar 463 provides the user with shortcuts to the most common commands from the main menu, such as opening or saving a project. The main toolbar 463 is displayed under the main menu and is composed of smaller toolbars grouped by functionality. The main toolbar is configurable by the user for including icons for most of the menu commands.

To develop a software program in the development environment, a user typically first creates a "project" to organize the program files and maintain the properties set for the program. The project pane 471 contains a list of the open project(s) and a tree view of the contents of the active project. As shown at FIG. 4, the active project file is the top node in the project pane 471 and the content pane 481 displays the contents of the active project file. In the currently preferred embodiment, the project pane 471 also includes a project pane toolbar 472 which includes buttons for closing a project, adding files or packages (e.g., by opening an "Add Files or Packages to Project" dialog box), removing files from a project, and refreshing the project (e.g., searching for source packages for the project).

The structure pane 475 displays the structure of the file currently selected in the content pane 481. The file structure is displayed in the form of a tree showing the members and fields in the selected file. When appropriate, the structure pane 475 also displays an "Errors" folder (not shown) containing any syntax errors in the file as well as an "Imports" folder (as shown at the top of the structure pane 475) containing a list of imported packages. In addition to providing a view of the structure of the class, the structure pane facilitates navigating to a class, or its methods or members, in the source code.

The content pane 481 displays all open files in a project as a set of tabs. Files may be opened in the content pane 481 by selecting the file from the project pane 471. The name of each open file is displayed on file tabs 482 at the top of the content pane. As shown, multiple file tabs 482 may provide access to various open files. A user may select a file tab (e.g., the "Welcome Frame" as shown at FIG. 4) to display a particular file in the content pane 481. The content pane provides a full-featured editor that provides access to text (i.e., source code) in a given project.

The content pane 481 provides access to various file views as well as status information by way of file view tabs 485 and a file status bar 486. Each of the file view tabs 485 shown at the bottom of the content pane provides a different view of the open file. The file view tabs 485 are context sensitive. Only tabs appropriate to the file open in the content pane appear below its window. For instance, a visually designable .java file typically has several tabs, including "Source", "Design", "Bean", and so forth as shown at FIG. 4. For instance, a user may select the "Source" tab to view source code of a program. Also shown at FIG. 4 is the modification of the development system 300 to implement the present invention. As shown, a user may select a "UML" file view tab to view Unified Modeling Language (UML) diagrams for a class or packages as hereinafter described in detail. The content pane 481 also includes a file status bar 486 which is displayed immediately above the file view tabs 485. The file status bar 486 displays information specific to the current file, such as the name of the file, the cursor location (line number and column), and the insertion mode in a text file.

The above-described computer hardware and software are presented for purposes of illustrating the basic underlying desktop and server computer components that may be employed for implementing the present invention. For purposes of discussion, the following description will present examples in which it will be assumed that there exists at least one computer running applications developed using the Java programming language. The present invention, however, is not limited to any particular environment or device configuration. In particular, use of the Java programming language is not necessary to the invention, but is simply used to provide a framework for discussion. Instead, the present invention may be implemented in any type of system architecture or processing environment capable of supporting the methodologies of the present invention presented in detail below.

The following description will focus on those features of the development system 300 which are helpful for understanding the methodology of the present invention for providing a fixed UML layout for an object oriented class browser.

II. Object Oriented Class Browser Providing Integrated UML Layout

A. Visualizing Code Using UML Diagrams

Currently, developers may view the structure of a software system using either a class browser or a UML modeling tool. Class browsers provide easy access to the source code; however they do not presently provide an overview of the system using standard UML notation. On the other hand, a UML modeling tool provides an overview of the system, but does not provide the ability to easily access the underlying code. The present invention provides an integrated solution providing a class browser that also displays UML diagrams which provide an overview of a complex software system. The present invention gives a user (e.g., a developer of a software program or system) a high level overview of a system using standard UML notation, while also providing immediate access to the underlying source code through a class browser. For example, a developer using a visual development system to develop a software application is provided a condensed and coordinated overview of the application using a standard graphical language.

The system of the present invention automatically generates UML diagrams from the source code (e.g., .java files), using a fixed layout that contains the most useful relationships between the components of the system. The UML diagrams are condensed and organized in a manner that provides the most important information, while omitting details that are less significant. This approach avoids overwhelming the developer with excessive detail or sprawling, multi-page diagrams.

In the currently preferred embodiment, the system of the present invention is incorporated as a component of the JBuilder 7.0 visual development system. However, the present invention is not limited to use in this context. Instead, the system and methods of the present invention may be advantageously used with any number of tools, including integrated development environments (IDE) and UML design tools. A number of different tools that have a class browser component may also advantageously use the system and method of the present invention to display UML diagrams of a program. Accordingly, use of the present invention in conjunction with a Java visual development system is used to provide a framework for discussion and not for purposes of limitation.

B. System Components

Figure 5:
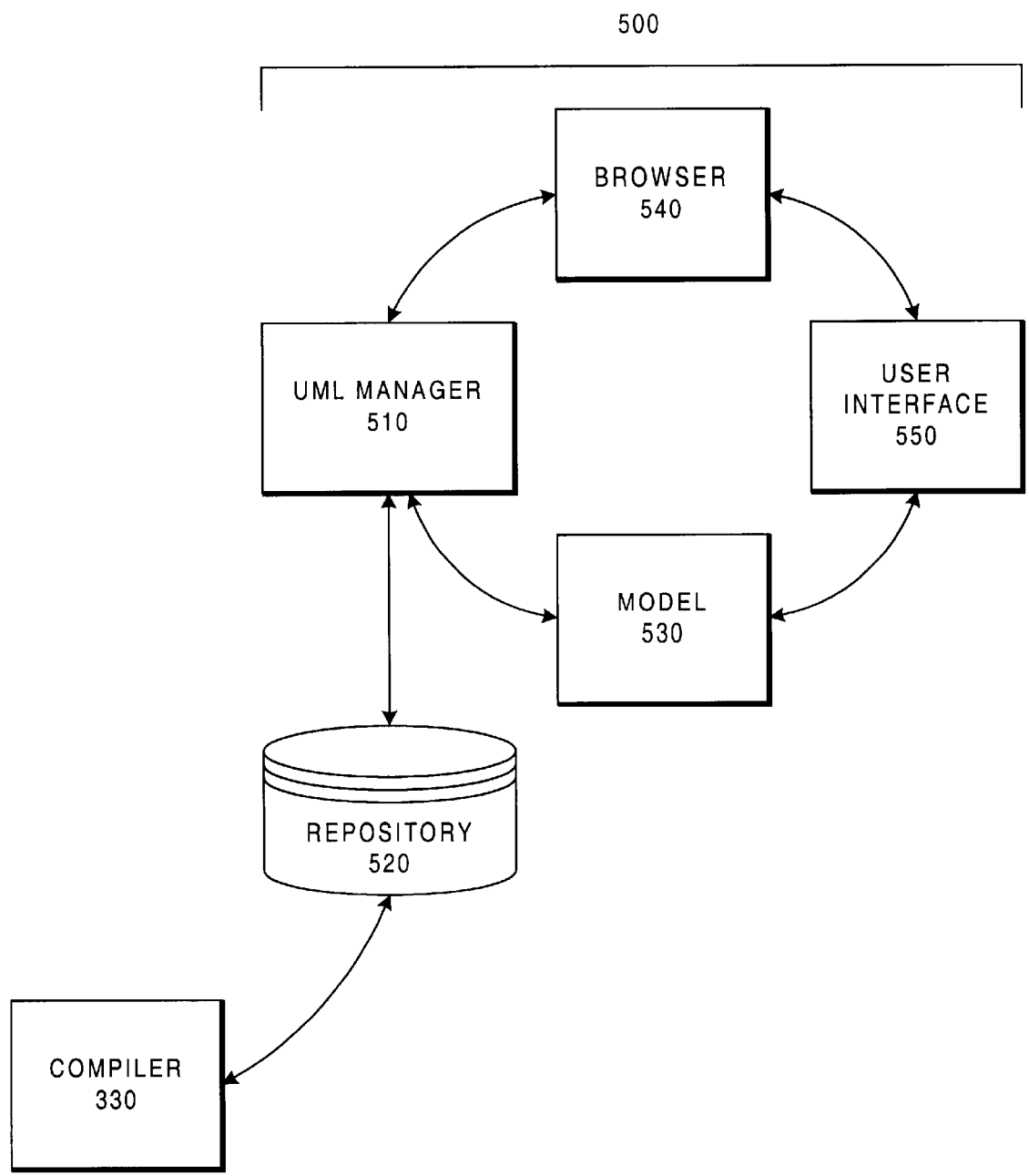
FIG. 5 is a high level block diagram of the components of the UML code visualization system of the present invention.

FIG. 5 is a high level block diagram of the components of the UML code visualization system 500 of the present invention. As shown at FIG. 5, the components of the currently preferred embodiment of the system 500 include a UML manager 510, a repository 520, a model 530, a browser 540 and a user interface 550. Also shown at FIG. 5 is the compiler 330 (e.g., a Java compiler) connected to the repository 520.

The repository 520 contains information regarding relations between components (e.g., Java classes) of a software program or application. These relations include superclasses, interfaces, associations, dependencies (both incoming and reverse), and subclasses. As shown, the repository 520 is connected to the compiler 330. As a software application or program is compiled by the compiler 330, entries consisting of information regarding relationships between classes of the program are placed into the repository 520.

The UML manager 510 interacts with the repository 520 to build the model 530 and the diagrams to be displayed to the developer or user. The model 530 is a data structure that is built (i.e., a class that is instantiated) by the UML manager 510 based upon the relationship information contained in the repository 520. When built, the model 530 contains objects describing all of the relationships between classes of a software application or system. The UML manager 510 then uses objects in the model 530 to generate UML diagrams for display to a developer or user via the user interface 550.

The browser 540 is used for navigating to and viewing the source code of the software application or system and/or the related UML diagram information regarding such system. The browser 540 also includes features enabling a user to elect to view UML information regarding a particular source module or file. As previously described, a developer may select a UML file view tab 485 as shown at FIG. 4 to view a UML diagram of a selected source file. A developer or user may also use the browser to navigate the UML diagram information and the underlying source files. For example, a developer may use the browser 540 to select (e.g., double click using a mouse) a particular object on a UML diagram to navigate to a particular class. The selected class would then typically be displayed via the user interface 550. The structure and organization of the UML information displayed to a developer or user via the user interface 550 will now be described.

C. UML File View Structure

Figure 6:
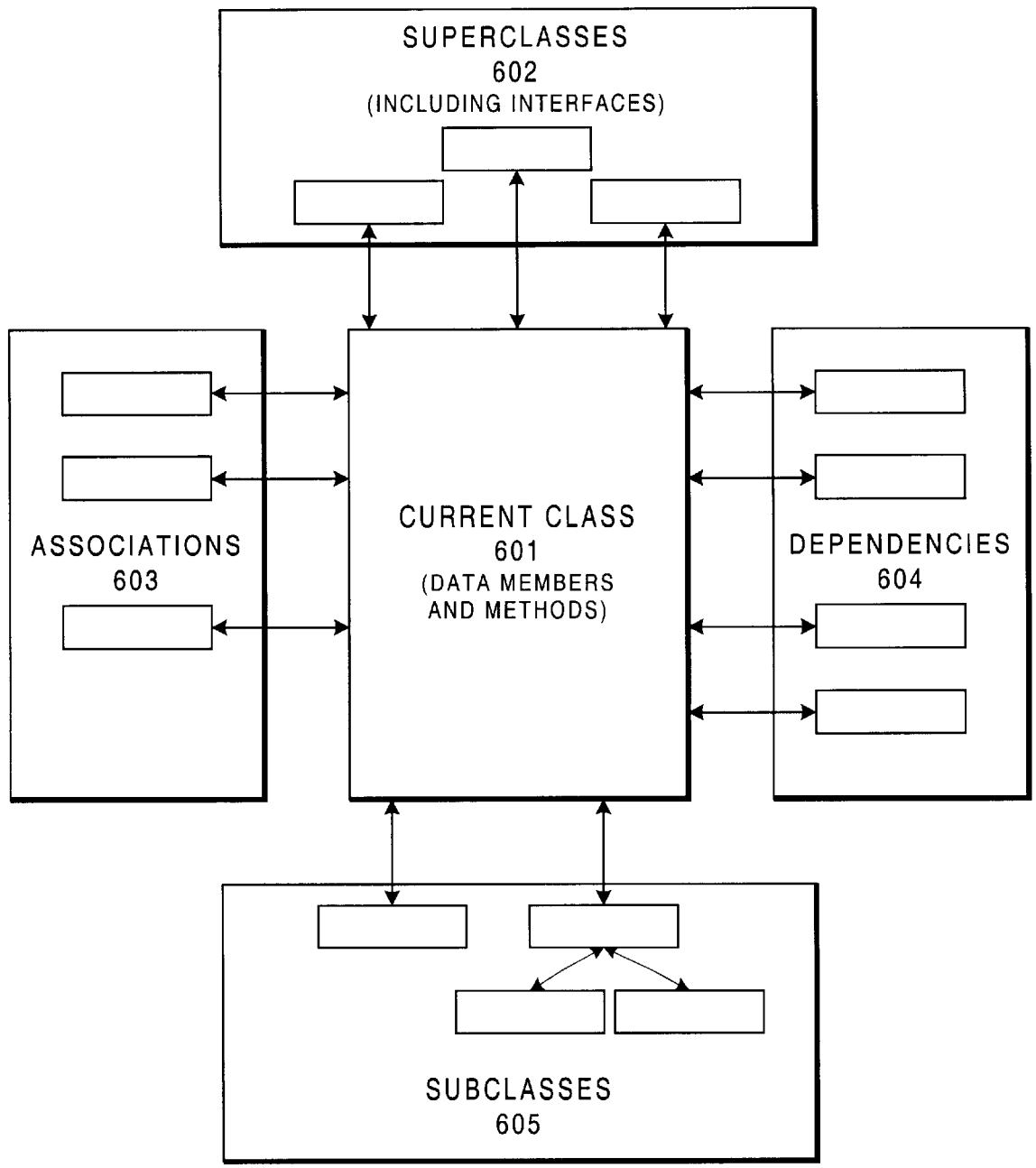
FIG. 6 is a block diagram of the structure of an exemplary UML combined class diagram provided in the currently preferred embodiment of the present invention.

FIG. 6 is a block diagram of the structure of an exemplary UML combined class diagram provided in the currently preferred embodiment of the system. As shown, the current class 601 selected by the developer is in the center of the generated combined class diagram. Data members and methods of the current class 601 are displayed in this center region of the user interface. All other classes relating to the current (center) class surround the current class at regions (or blocks) 602, 603, 604, 605. By using the browser features of the present invention, the developer is able to navigate to any of the related classes, which will result in a UML diagram that has the newly selected (i.e., current) class in the center of the diagram.

Related classes are shown in a condensed form surrounding the current (or center) class 601 to make the information more useful to a developer. In the currently preferred embodiment the display of information is structured by placing different types of relationships in different regions of the UML display as illustrated by the blocks 602, 603, 604, 605 shown at FIG. 6. Each of these regions is implemented as a separate panel of a UML diagram as a way of organizing the UML diagram information for presentation on the user interface.

Each of these regions contains a group (or set) of relations of a similar type. Superclasses, including interfaces, are displayed above the current class 601 as shown at block (region) 602. Superclasses are classes from which the current class inherits structure or behavior. Regions to the left and right of the current class 601 contain associations and dependencies as shown at blocks 603 and 604, respectively. A "dependency" is a using relationship in which a change to an object may affect another dependent object. An "association" is a specialized type of dependency where a reference to another class is stored. Below the current class are subclasses as shown at block 605. Subclasses are classes that inherit structure or behavior from the current class. It should be noted that the five regions illustrated by blocks 601, 602, 603, 604, 605 comprise one unified UML diagram. However, the UML diagram information is split up into five regions to assist a developer or user of the system in understanding the information that is presented.

Within each of the regions (blocks) 602, 603, 604, 605, items are organized and condensed to reduce the complexity of the UML diagram information. For example, classes that are already illustrated as superclasses, associations, or subclasses are not also shown as dependencies. This reduces the amount of repetitive information to be displayed. Also, classes are grouped by package in the currently preferred embodiment. For instance, dependent classes are grouped by package and displayed horizontally in region (block) 604 and subclasses are shown vertically and are stacked within packages in region (block) 605. The horizontal and vertical orientation of these groups enables more efficient use of the available space on the screen (user interface). Because class names are typically quite long and use the package name as a common prefix, grouping classes by package also enables the class names to be shortened. The package name can be displayed only once, with shorter names used for each class file in the package. This allows better use of the available space and reduces repetitive information.

The present invention also provides for items in each region of the UML diagram to be sorted for presentation to the user interface. In the currently preferred embodiment, items are generally sorted by placing information considered to be more important towards the top of the diagram. For example, incoming (reverse) dependencies are typically considered to be more significant to the class currently being viewed (i.e., the current class 601), and therefore are placed towards the top of region (block) 604. However a developer may customize the display to provide for different arrangement of information, if desired.

In addition to organizing and condensing information in the UML diagrams, color-coding, arrows, and icons are used to quickly provide additional information. For instance, dependencies are illustrated by arrows directed away from the center class 601 towards block 604 while incoming (or reverse) dependencies are illustrated by arrows directed inwards towards the center class 601. Items in the same package with the current class 601 are indicated by a given color (e.g., red), while another color (e.g., green) indicates that an item is in another package. The UML diagramming features of the currently preferred embodiment will now be described in greater detail.

D. Visualization of UML Diagrams

1. Java and UML Terms

The following discussion focuses on the use of UML in a Java language environment. The present invention, however, is not limited to any particular environment. In particular, use of the Java programming language is not necessary to the invention, but is simply used to provide a framework for discussion. UML, a valuable tool in understanding complex relationships between elements of a system, assists developers in understanding the overall design and structure of a software system. For instance, UML can assist Java developers in understanding the relationships between classes and packages of a software program written in the Java programming language. Like Java, UML is object oriented and platform independent.

Given that UML is used with a number of programming languages as well as in a wide range of other situations, UML uses broad terms to describe relationships between objects. In some cases, the UML and Java definitions of certain terms are similar. However, in other cases terms are defined differently in UML and Java. In this document, Java terms and definitions are used unless otherwise indicated. To aid in the following discussion, the following are Java definitions of several terms used throughout this document:

| Java term | Java definition |
|---|---|
| Inheritance | A mechanism that allows a class or interface to be defined as a specialization of another more general class or interface. For example, a subclass (child) inherits its structure and behavior, such as fields and methods, from its superclass (parent). Class and interfaces that inherit from a parent use the extends keyword. |
| Dependency | A using relationship in which a change to an independent object may affect another dependent object. |
| Association | A specialized dependency where a reference to another class is stored. |
| Interface | A group of constants and method declarations that define the form of a class but do not provide any implementation of the methods. An interface specifies what a class must do but not how it gets done. Classes that implement the interface use the implements keyword. |
| Method | The implementation of an operation which is defined by an interface or class. |
| Field | An instance variable or data member of an object. |
| Property | Information about the current state of a component. Properties can be considered as named attributes of a |

-continued

| Java term | Java definition |
|---|---|
| | component that a user or program can read (get) or write (set). In a UML diagram, a property exists when a field name matches a method name which is preceded by "is", "set", or "get". For example, a field named parameterRow is a property if it has a method named setParameterRow( ). |

2. Code Visualization and UML Diagramming

The currently preferred embodiment focuses on code visualization and UML diagramming in a Java programming language environment. UML functionality of the system allows a developer to visually browse Java packages and classes in order to better design, understand, and troubleshoot an application. Two different types of UML diagrams are available in the currently preferred embodiment. The first is referred to as a "combined class diagram." The second is a "package dependency diagram." Both types of diagrams are described below. In addition, a browser provides additional features, such as viewing source code, initiating refactoring of a program, customizing the UML display, and viewing documentation (e.g., Javadoc).

3. Combined Class Diagram

Figure 7A:
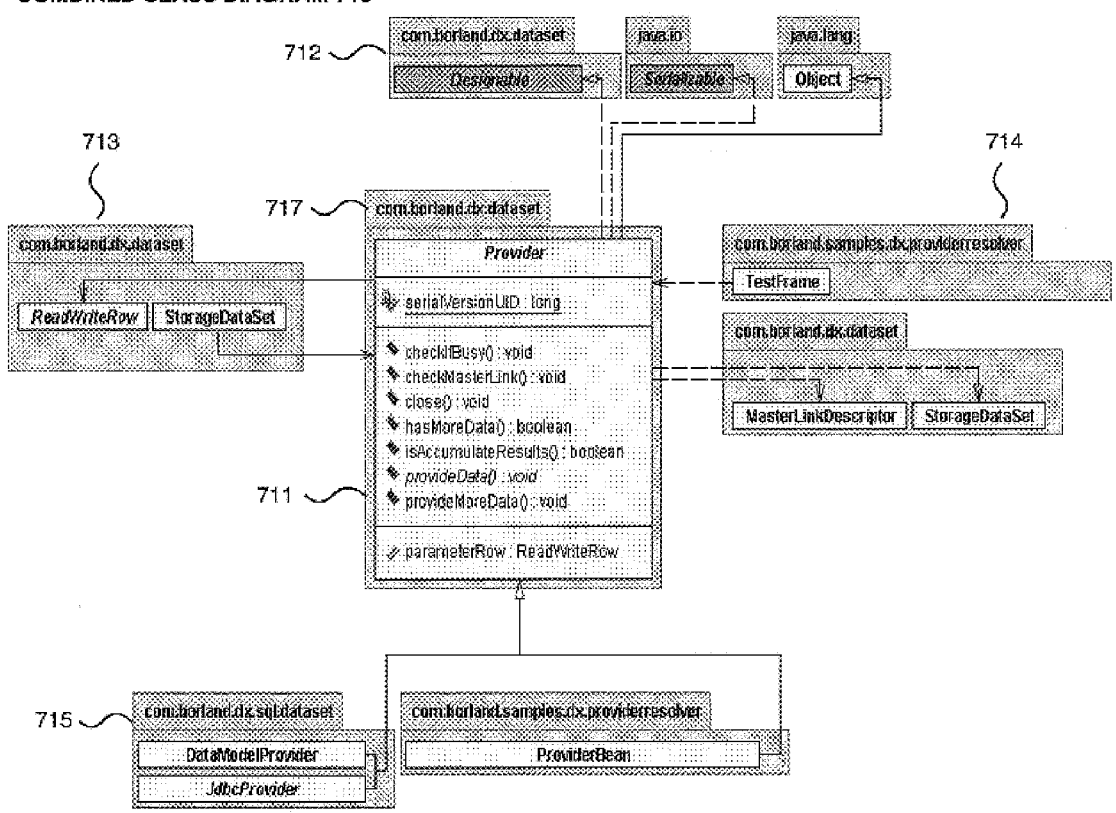
FIG. 7A illustrates an exemplary combined class diagram for a Java source file.

FIG. 7A illustrates an exemplary combined class diagram 710 for a Java source file. As shown, the current class 711 that is open in the editor is displayed in the center of the diagram with associations 713 on the left and dependencies 714 on the right. Superclasses 712, which includes both extended classes and extended interfaces (parent interfaces) appear at the top of the diagram (i.e., above the current class 711), while subclasses 715 (i.e., extending and implementing classes) appear at the bottom of the diagram. This is the same structure previously described and illustrated at FIG. 6. Classes in each of the regions 712, 713, 714, 715 are grouped according to package. In the currently preferred embodiment grouped associations and dependencies are sorted by placing reverse associations on the top left side of the center (or current) class and reverse dependencies on the top right of the current class 711. Associations and dependencies with mixed relations are on the middle left and middle right of the current class 711; all remaining associations and dependencies are on the lower left and lower right of the current class.

In the currently preferred embodiment, the UML class diagram displays the current class 711 in the center of the diagram in a rectangle with a default yellow background. The color selection may be customized, if desired, as hereinafter described. Surrounding the class is the package with the package name in a tab 717 at the top of the current class 711. As shown at FIG. 7A, the current class 711 itself is divided into several sections, which are separated by horizontal lines. Each section typically includes the class name, fields and properties of the class, methods, getters, and setters of the class. By default, properties are displayed in the bottom section of the class diagram. The organization of this information is described in more detail below.

4. Package Dependency Diagram

Figure 7B:
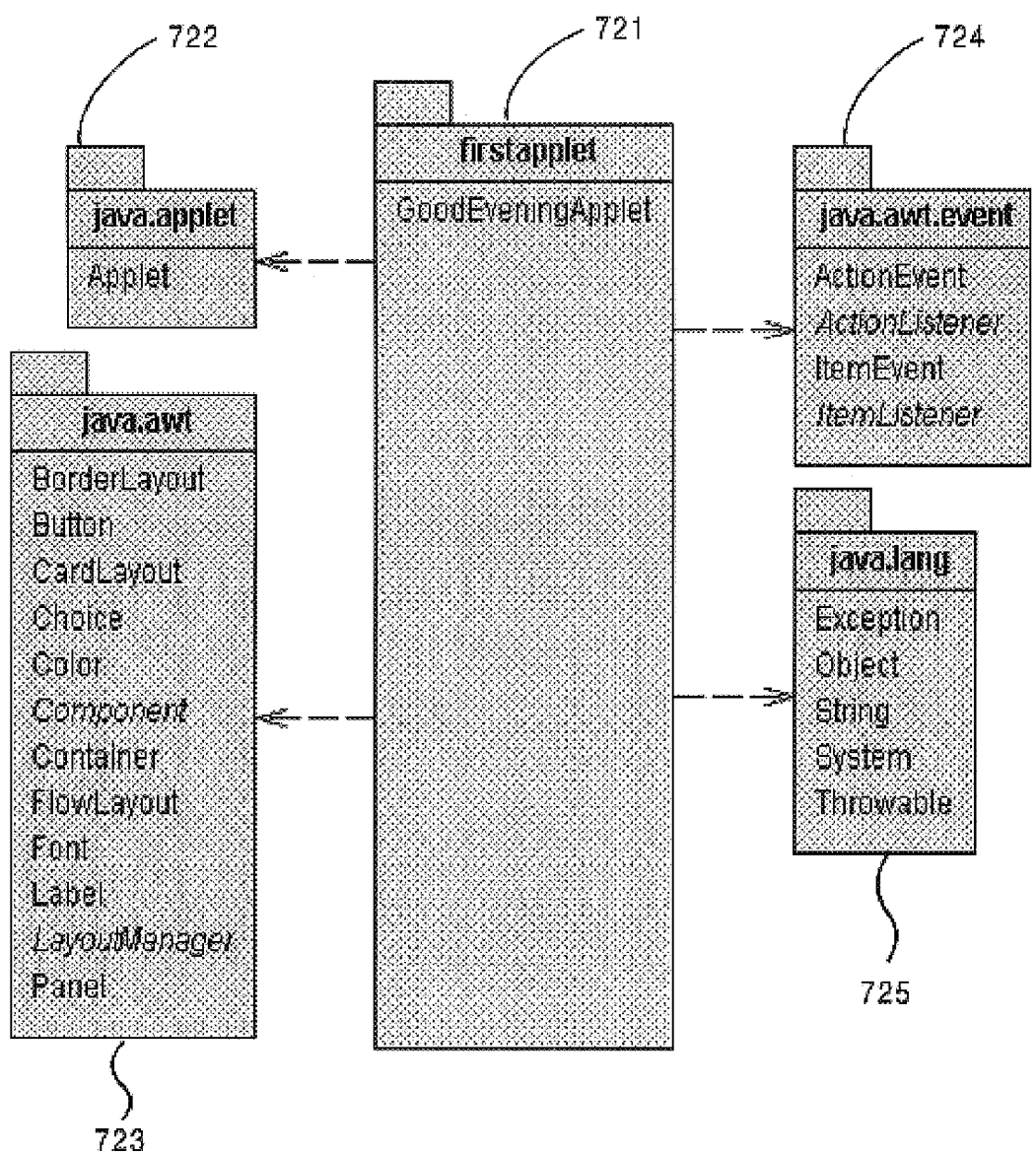
FIG. 7B illustrates an exemplary package dependency diagram.

A package dependency diagram is centered on a central package and shows only the dependencies of that package. It does not show the dependencies between the dependent packages. FIG. 7B illustrates an exemplary package dependency diagram 720. Dependencies and reverse dependencies appear on the left side, the right side, or both sides of the central package. As shown at FIG. 7B, packages 722, 723, 724, 725 with dependencies and reverse dependencies appear on both sides of the center package 721. Packages with dependencies display the specific dependent classes within the package. A developer can navigate to any of the displayed classes by double-clicking them in the diagram. In the currently preferred embodiment, the current (central) package 721 is displayed in a bright green background by default. All other packages (e.g., 722, 723, 724, 725) have a darker green background by default. Although only the current package and imported packages are typically displayed in the package dependency diagram, a developer can customize the diagram to include references from the project library classes, if desired. An option to include library references is provided in the currently preferred embodiment.

5. Options for Display of Properties

Figure 7C:
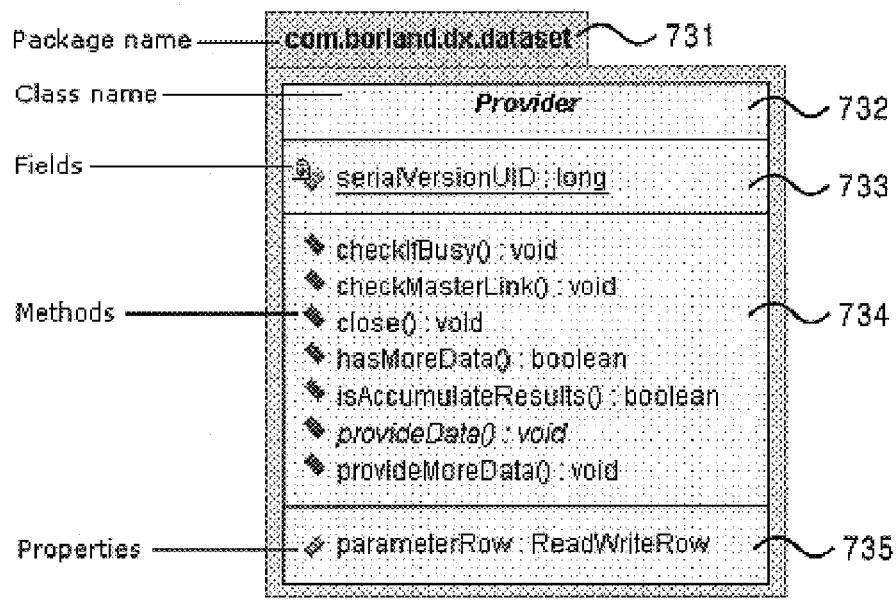
FIG. 7C illustrates a sample class diagram with the properties displayed separately.

A developer may, if desired, configure the system to display properties of the current class in the appropriate sections with the fields and methods as described below using a "Display Properties Separately" option provided in the currently preferred embodiment. FIG. 7C illustrates an exemplary class diagram 730 with properties displayed separately. As shown, the package name is included on a tab 731 at the top of the class diagram 730. The class name is in section 732 immediately below the package name. Fields and methods are displayed below the class name in sections 733 and 734, respectively. Properties are displayed separately in section 735 at the bottom of the class diagram 730.

Figure 7D:
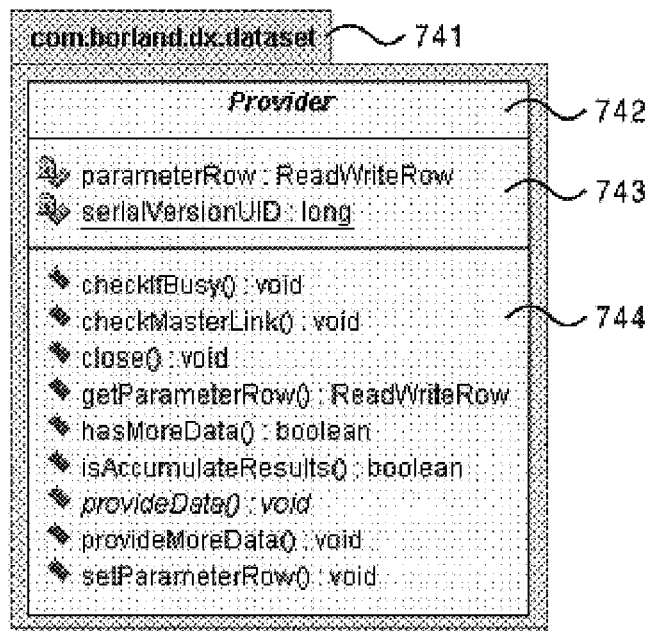
FIG. 7D illustrates a sample class diagram in which the properties are not separately displayed.

A developer or user may prefer not to separately display the properties. FIG. 7D illustrates a sample class diagram 740 in which the properties are not separately displayed. As shown, the package name displayed in tab 741 and the class name displayed in section 742 are the same as the corresponding portions of FIG. 7C (i.e., tab 731 and section 732). However, the property parameterRow: ReadwriteRow is included in section 743 with the field serialVersionUID: long. In addition, getParameterRow( ): ReadWriteRow is included in section 744. The display of UML diagram information will now be described in greater detail.

6. UML Diagram Definitions

The following is a table which summarizes how particular types of information are displayed in UML diagrams of the currently preferred embodiment. The following lists definitions for folders (i.e., folders in the structure pane), terms in the diagram, and the corresponding UML representation. For example, dependencies appear in a "Dependencies" folder in the structure pane and are represented in a UML diagram by a dashed line.

TABLE

UML diagram definitions

| Diagram Term | Definition | Diagram Description |
|---|---|---|
| Extended Classes | Classes whose attributes (fields and properties) and methods are inherited by another class. Also called superclass, parent class, or base class. | A solid line with a large triangle that points from the subclass (child class) to the superclass (parent class). Displayed at the top of the UML diagram. |
| Classes | Structures that define objects. A class definition defines fields and methods. | Displayed in a rectangular box with a default yellow background with the name at the top and files, methods, and properties listed below it. |
| Abstract Classes | Classes that are superclasses of another class but that cannot be instantiated. | Displayed in italic font. |
| Extending Classes | Classes that extend (inherit from) the superclass. Also called subclass or child class. | A solid line with a large triangle that points from the subclass to the superclass. Displayed at the bottom of the UML diagram. |
| Implementing Classes | Classes that implement the central interface. | A dashed line with a large triangle which points from the implementing class to the inherited interface. Displayed at the bottom of the UML diagram. |
| Extended Interfaces | Parent interfaces that are inherited by a subinterface. | A solid line with a large triangle that points from the subinterface to the inherited interface. Displayed at the top of the UML diagram. |
| Interfaces | Groups of constants and method declarations that define the form of a class but do not provide any implementation of the methods. | A rectangle with a default orange background and the interface name in italic font. |
| Implemented Interfaces | Interfaces that are implemented by the central class. | A dashed line with a large triangle which points from the implementing class to the implemented interface. Displayed at the top of the UML diagram. |
| Dependencies/ Reverse Dependencies | Using relationships in which a change to the used object may affect the using object. | A dashed line with an arrowhead. |
| Associations/ Reverse Associations | Specialized dependencies where a reference to another class is stored. | A solid line with an arrowhead. |

TABLE-continued

UML diagram definitions

| Diagram Term | Definition | Diagram Description |
| --- | --- | --- |
| Packages | Collections of related classes. | A rectangle with a tab at the top and the package name in the tab or below it. The current package has a bright green background by default. All other packages have a darker green background by default. |
| Methods | Operations defined in a class or interface. | Listed below members and fields, including the return type. |
| Abstract methods | Methods that do not have any implementation. | Displayed in italic font. |
| Members/fields | Instance variables or data members of an object. | Listed below the class name, including the return type. |
| Properties | Properties exist when a method name matching a field name is preceded by "is", "get", or "set". For instance, a field name parameterRow with a getParameterRow ( ) method is a property. | Properties are displayed separately in the bottom section of the class diagram if the "Display Properties Separately" option is set on the UML page of the IDE Options dialog box ("Tools|IDE Options"). |
| Static | Having a class type. | Static members, fields, variables, and methods are underlined in the UML diagram. |

7. Visibility Icons

Figure 7E:
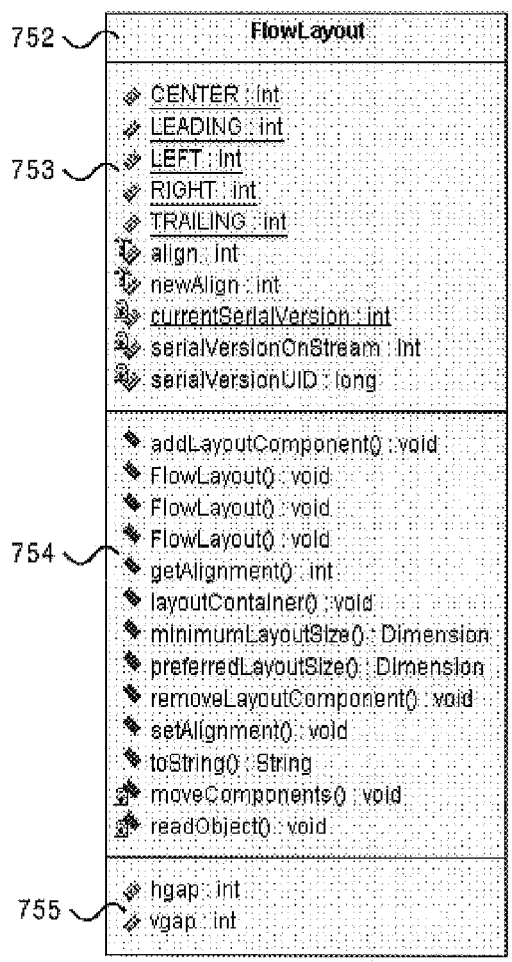
FIG. 7E is an illustration of a UML diagram of a sample class using custom visibility icons.

UML uses icons to represent the visibility of a class, such as public, private, protected, and package. The currently preferred embodiment provides an option to use standard UML icons or custom visibility icons in UML diagrams. FIG. 7E is an illustration of a UML diagram 750 of a sample Flow__layout class using custom visibility icons. As shown, the UML diagram 750 includes a class name 752, a fields section 753, a methods section 754, and a properties section 755, which are displayed using custom visibility icons. These custom visibility icons are the same icons used in the structure pane in the source code. To use visibility icons in UML diagrams, a developer may choose a "Use Visibility Icons" option on the UML page of the IDE Options dialog box ("Tools | IDE Options") of the currently preferred embodiment.

Figure 7F:
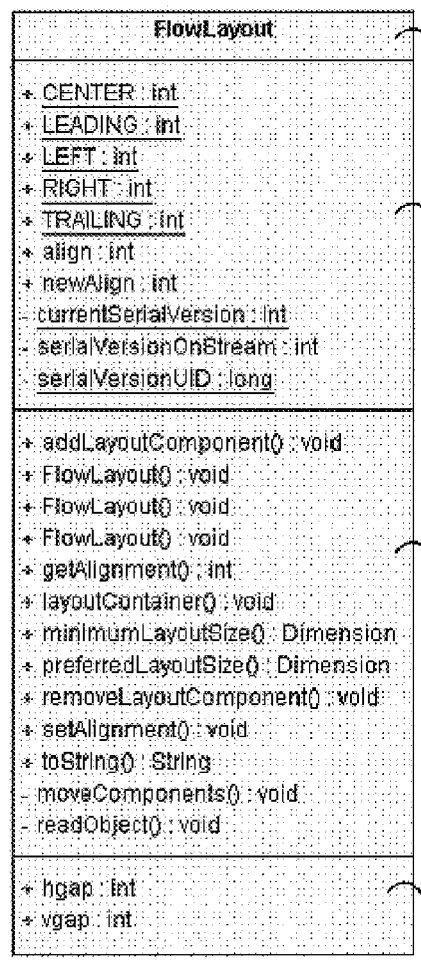
FIG. 7F is an illustration of a UML diagram of the same sample class using UML icons.

Alternatively, standard UML notation may be used for display. FIG. 7F is an illustration of a UML diagram 760 of the same sample Flow__layout class using the UML icons. The UML diagram 760 includes a class name 762, a fields section 763, a methods section 764, and a properties section 765, which are displayed using UML notation. The class name, fields, methods, and properties sections of the diagrams 750 and 760 have the same structure; however diagram 760 uses more generic UML icons. As shown at FIG. 7F, the UML icons used to represent the visibility of a class include the "+" icon for public, the "−" icon for private and the "#" icon for protected. The browser for viewing UML diagrams will now be described.

E. Viewing UML Diagrams

1. UML Browser

The system of the present invention also provides a browser for visualizing code using UML diagrams. This browser (referred to as a "UML browser"), which is available on the UML file view tab 485 of the content pane 481 in the presently preferred embodiment (as previously described and illustrated at FIG. 4), displays package and class diagrams using UML notation. When a developer selects the UML file view tab, the class files are loaded to determine their relationships, which the UML browser then uses to obtain the package and class information for the UML diagrams.

For an up-to-date and accurate UML diagram of a program, it is recommended that the program be compiled before the UML file view tab is selected. The UML browser displays Java source files dynamically even if they have not been compiled, but only displays uncompiled source files if they are on the source path. In this situation, a message is displayed in the browser indicating that the UML diagram may not be accurate. However, if a source file is not on the source path, a message indicates that the .class file must be generated before a UML diagram of the class can be generated. If one or more binary files (e.g., .class files) are out of date, for example if a source file has been changed but has not been recompiled, a message is displayed in the UML browser indicating that the UML diagram may not be accurate. The UML browser also supports diagramming of reverse dependencies from classes to Java Server Pages (JSPs). For example, a Java bean generated using a JSP wizard can be linked to the Java Server Page (JSP) that uses this Java bean. The same approach can also be utilized for any class that the JSP uses.

After changes have been made to a project, the UML diagrams may be refreshed using a "Refresh" button provided on the "project pane" toolbar of the currently preferred embodiment. The UML diagrams may also be refreshed by rebuilding the projects. Projects may be rebuilt using a "Project|Rebuild Project" command provided by the development system.

Figure 8A:
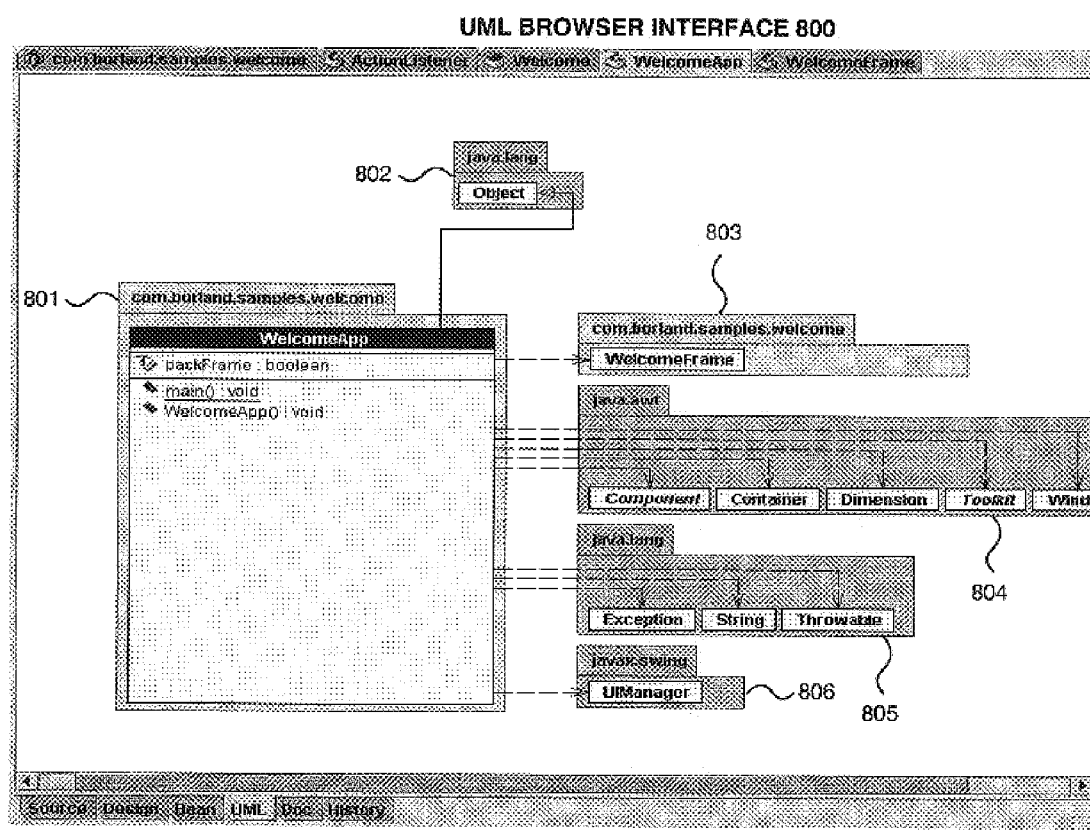
FIG. 8A illustrates a preferred UML browser interface provided by the system of the present invention.

FIG. 8A illustrates a preferred UML browser interface 800 provided by the system of the present invention. As shown, the UML diagram displayed in the UML browser interface 800 for a sample center class 801 (com.borland.samples.welcome.WelcomeApp) includes several relationships between center class 801 and other program components. These relationships include: a subclass relationship with class 802 (java.lang.Object), a dependency on class 803 (com.borland.samples. welcome.WelcomeFrame), and dependencies on various classes in folders 804, 805, 806.

The UML diagram is organized and presented in a manner that assists the user in understanding this relationship information. For instance, the dependency on class 803, which belongs to the same package as the center class 801, is shown using a lighter color. Dependencies on various classes in folders 804, 805, 806, which belong to different packages than the center class 801, are shown in a darker color. Classes 802, 803, and the various classes in folders 804, 805, 806 are grouped together according to their package relationship. Classes belonging to the same package are shown in the same package outline folder, with the name of each package shown at the top of each folder. In the currently preferred embodiment, selecting (e.g., double-clicking the mouse on) a class or package other than class 801 in the UML browser interface 800 navigates to a UML diagram of the selected class. Selecting (e.g., double-clicking on) class 801 navigates to the source code for class 801.

The UML browser interface 800 has a context menu (not shown) for quickly accessing common commands. In the currently preferred embodiment, a developer may right-click an element (using a mouse) in the UML browser interface 800 to activate the menu. For example, the context menu includes a "save diagram" command for creating images of a UML diagram. The context menu also contains options to directly navigate to the source for any class or package shown in the diagram.

There are several ways to navigate (or scroll) the UML diagram in the UML browser: a developer may use the mouse, "Page Up" and "Page Down" keys, arrow keys, and/or scroll bars to navigate the UML diagram. The behavior differs according to the type of view displayed. The full view ("View|Hide All") only displays the content pane. The partial view ("View|Show All") displays the following panes by default: project pane, content pane, and structure pane.

In the full view ("View|Hide All"), a developer can use the mouse to move the view up and down by selecting the background of the diagram, then clicking and dragging the diagram. The "Page Up" and "Page Down" keys, as well as the up and down arrow keys, may also be used to move the view up and down. A developer can also manually scroll the view using the scroll bars.

In the partial view ("View|Show All"), the diagram can be dragged in all directions by selecting the background of the diagram, then clicking and dragging the diagram in the desired direction. The "Page Up" and "Page Down" keys can also be used to move the view up and down. All four arrow keys typically provided on a computer keyboard can also be used to move the view in any direction. This partial view can also be manually scrolled using the scroll bars. A structure pane view is also available for an alternative view of the UML diagram information as described below.

2. UML and the Structure Pane

Figure 8B:
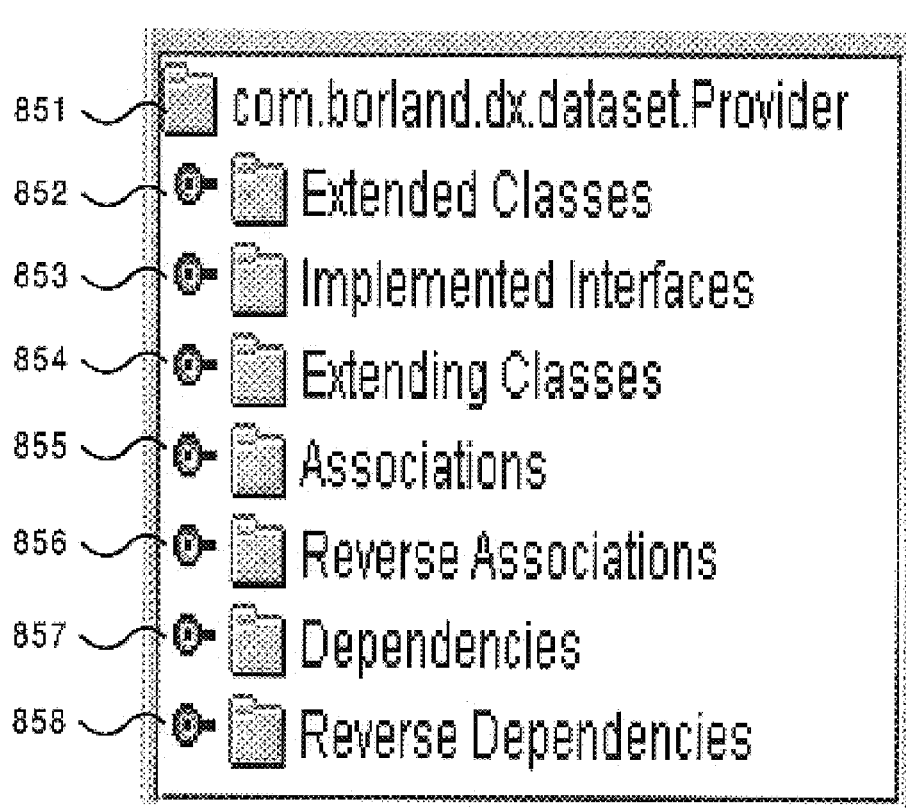
FIG. 8B illustrates an exemplary structure pane of a sample UML diagram.

FIG. 8B illustrates an exemplary structure pane 850 of a sample UML diagram. As shown, structure pane 850 provides a tree view of relationships contained in expandable folders by category. For package diagrams the structure pane can include "Dependencies" and "Reverse Dependencies" folders. Opening a dependent package shows all the classes in that package with the given relationship to the central package. This allows one to find out which classes in a dependent package are causing the dependency. For class diagrams, the structure pane can include folders for "Extended Classes", "Extended Interfaces", "Implemented Interfaces", "Extending Classes", "Implementing Classes", "Associations", and "Reverse Associations" in addition to "Dependencies" and "Reverse Dependencies" folders. If any of the categories are not included in the diagram, the folder does not appear. As shown, the structure pane 850 for a sample class 851 (com.borland.dx.dataset.Provider) includes the following folders: an extended classes 852, an implemented interfaces 853, an extending classes 854, an associations 855, a reverse associations 856, a dependencies 857, and a reverse dependencies 858.

These folders offer navigation to other diagrams and may also provide information which is not in the UML diagram, since the structure pane folders reflect the relationships without regard to filtering settings or other restrictions. For example, even if specific classes and packages have been filtered out for purposes of generating the UML diagram, these classes still appear in the structure pane. Folder icons in the structure pane can be expanded and collapsed by double-clicking them using the mouse or by toggling an "expand" icon.

The structure pane can also be used for selection and navigation to a class or package. A class, interface, or package may be selected in the structure pane to select it in the diagram. Double-clicking a class or package in the structure pane navigates to its UML diagram. A UML package diagram may be opened by right-clicking a package and choosing an option to view the UML package diagram. One can also quickly search for a package or class in the structure pane by moving the focus to the tree and starting to type in the desired class or package name.

3. Customizing UML Diagrams

The UML browser of the currently preferred embodiment provides various features enabling a developer to customize the UML diagram display as well as to navigate diagrams and source code, view inner classes, source code, and documentation, and create and print images. The UML display can be customized using "Project Properties" and "IDE Options" dialog boxes. For example, what is displayed in a given diagram may be filtered on a project basis. References from project libraries may also be included, if desired. A developer can also globally customize the UML diagram display by setting the sort order, font, colors, and using various other options provided in the currently preferred embodiment.

Packages and classes can be excluded from UML diagrams of a given project or program using a "Project Properties" dialog box on the UML page. This same dialog box may also be used to include references from generated source. An "Add" button may be used to add classes or packages to the exclusion list. Any classes or packages added to the exclusion list are then excluded from the UML diagram. However, the excluded packages and classes remain accessible in the structure pane, as previously described. Selecting the "Diagram References From Generated Source" option causes source references, such as Enterprise Java Bean (EJB) stubs, to be generated for display in the UML diagram. If filtering is set in the "Project Properties" dialog box, all of the diagrams in the project are filtered. Disabling filtering from the context menu in one diagram does not disable it for all diagrams.

Typically, libraries provide services to the applications that are built upon them. However, libraries do not know anything about how the application is using their services. To show library relationships, an "Include References From Project Library Class Files" option may be selected on the general page of the Project Properties dialog box to display references from the libraries in the UML diagrams generated by the system. By default, this option is off (not selected) and reverse dependencies from a library to a project are excluded from the UML diagrams.

4. Setting IDE Options

The UML page of the "IDE Options" dialog box ("Tools | IDE Options") provides options for global customization of UML diagrams in the UML browser. To access the UML page, a developer may select "Tools | IDE Options", and click the UML tab. This enables modification of visibility icons, grouping order, sorting order, properties display, font family and size, and colors for the various screen elements of the UML diagrams generated by the system. A developer may also utilize a "Help" button provided on the UML page for more information about display options.

5. Navigating diagrams

A package or class name in a UML diagram may be selected (e.g., by double-clicking the mouse) to navigate to a UML diagram for the selected package or class. When an element is selected in the UML diagram, the background highlighting color changes. After selection, the "Arrow" keys may be used to move up and down the diagram. If nothing is selected, the "Page Up" and "Page Down" keys can be used to scroll up and down the diagram. Browser history may be used to browse previously viewed UML diagrams. "Forward" and "Back" buttons available on the main toolbar can also be used for easy back and forth navigation between UML diagrams. A developer can also navigate by choosing packages and classes in the structure pane (e.g., by clicking a package or class to select it in the diagram or by double-clicking a class to see its UML diagram). The currently preferred embodiment also includes a selection on the context menu of the UML browser for viewing UML diagrams.

6. Viewing Inner Classes

A single class may contain more than one class, including inner classes and anonymous inner classes. In this situation, the UML browser presents a tabbed user interface with one class per tab. Individual anonymous inner classes are only diagrammed if the editor cursor is positioned in that class or the class is navigated to from another diagram. Such selected anonymous inner classes are remembered until the file is closed, so they can accumulate as tabs in the UML browser. Dependencies of anonymous inner classes are folded into the classes which contain them. The UML browser uses the cursor position in the editor to determine the class, method, and/or field that is selected in the UML browser. However, if that cursor position is unchanged on subsequent visits to the viewer, the last selection is typically retained.

7. Viewing Source Code

In a class diagram, a developer can navigate to the underlying source code and back to the UML diagram using the browser. To view the source file for a particular class, the developer can select (e.g., double-click the mouse on) the class, or a method, field, or property of the class. The cursor is positioned appropriately in the editor. Conversely, positioning the cursor in a class, method, field, or property in the editor also highlights the class in the UML diagram. When in the editor, the UML file view tab may be selected to return to the UML diagram.

The UML browser also provides tools for viewing source code underlying UML diagrams. The context menu of the UML browser includes a menu selection ("Go To Source") which may be selected to view the source code in the editor. This can be useful for viewing source code for other classes and interfaces in package and class diagrams. The UML browser also provides "tool tips" for quickly viewing the argument list for methods. The mouse may be moved over a method to see its tool tip or over a class name to see its fully qualified class name, which includes the package name.

8. Viewing Documentation

The system, in its presently preferred embodiment, provides several ways to access documentation (e.g., Javadoc) for packages, interfaces, classes, methods, and fields within a UML diagram. An element may be marked in a UML diagram and a "View Javadoc" command may be selected to view the documentation. Alternatively, an element may be selected in the UML diagram or the structure pane and "F1" pressed on the computer keyboard to display help information for such element. Pressing the "F1" or "Help" button usually causes the display of the documentation (e.g., Javadoc) which is generated either from Javadoc comments in the source file or from available information such as method signatures.

9. Creating Images of UML Diagrams

The UML browser also enables UML diagrams to be saved as images. The UML browser supports the Portable Network Graphics (PNG) format for images. A UML diagram may be saved as an image by selecting (e.g., right-clicking) the image in the UML browser and choosing a "Save Diagram" menu option. A UML diagram may also be printed from the UML browser. A "Print" button on the main toolbar or a print command ("File | Print") can be used to print a UML diagram. Alternatively, a UML diagram can be printed using a page layout command ("File | Page Layout") to set up page headers, set margins, and change the page orientation. The printed diagram is typically scaled down from the size on the screen. Diagrams that are too large to fit on a page are printed as multiple pages.

10. Refactoring and Find References

The UML browser also provides access to refactoring features provided in the visual development system of the currently preferred embodiment. There are several ways to initiate refactoring from the UML browser. For instance, a class can be rename refactored by selecting (e.g., by mouse right-click) the class in the UML diagram and choosing a "Rename" option from the context menu. Alternatively, a developer may select a package, class, field, or method name in the UML diagram and press the "Enter" button on the keyboard to display a "Rename" dialog box. A move refactoring of a class may be performed by selecting a class name in the UML diagram and choosing "Move from" in the context menu. Before refactoring, a developer may also wish to find all source files using a selected symbol. To locate all references to a symbol, the symbol may be selected in a UML diagram or in the editor. A "Find References" command may then be used to find source files using the selected symbol. For further description of a system for refactoring a software program, see e.g., commonly-owned U.S. application pending Ser. No.: 10/209,283, filed Jul. 30, 2002 entitled "System and Methodology Providing Compiler-Assisted Refactoring," the disclosure of which is hereby incorporated by reference.

F. Method for Generating UML Diagrams from Source Files

Figure 9A:
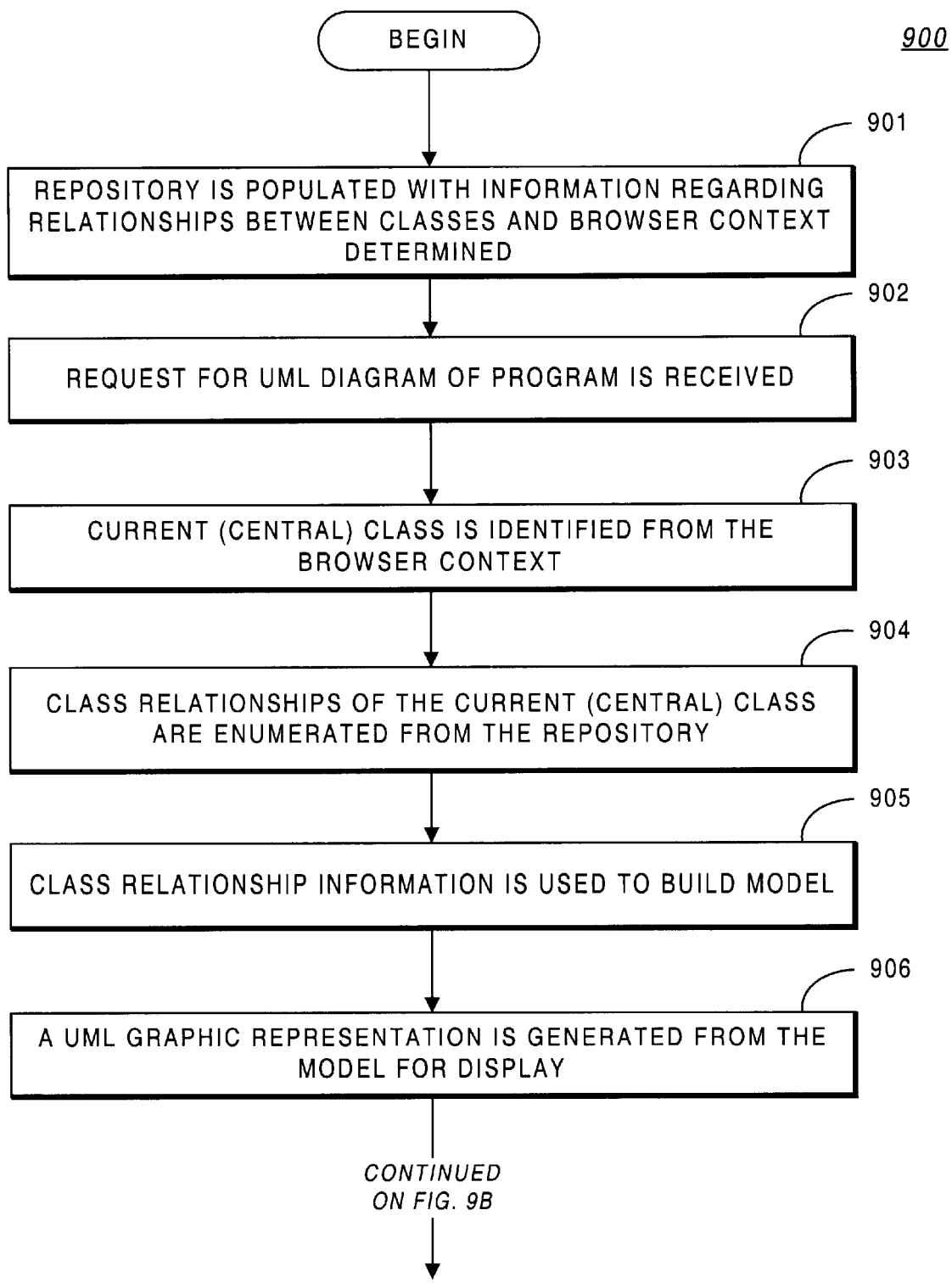
FIGS. 9A-B comprise a single flowchart illustrating the detailed method steps of the operations of the system of the present invention in generating UML diagrams for display in an object oriented class browser.
Figure 9B:
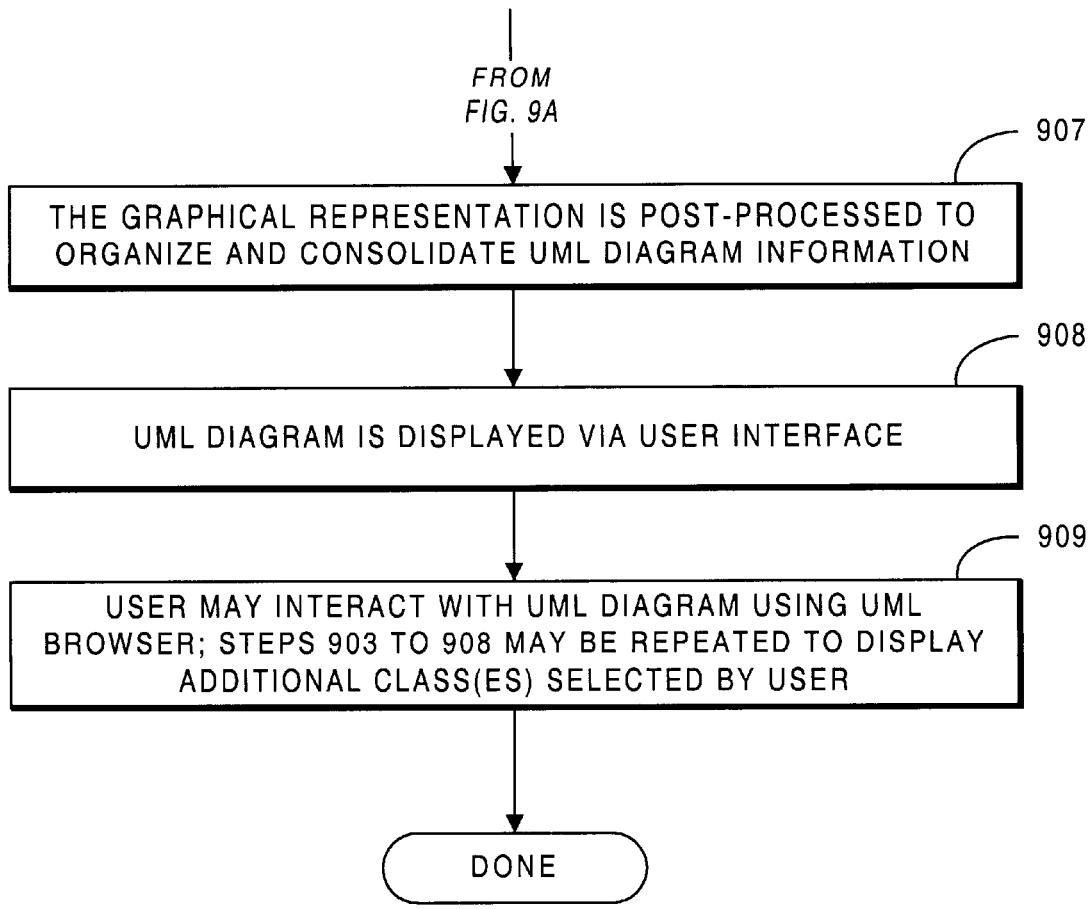

FIGS. 9A–B comprise a single flowchart 900 illustrating the detailed method steps of the operations of the system of the present invention in generating UML diagrams for display in an object oriented class browser. The method steps described below may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

A developer initially creates a software program or system consisting of one or more source file(s) to perform particular tasks. The source files may, for instance, comprise .java files for a software application that has been developed in the Java programming language for installation on a particular environment (e.g., an e-commerce application to be installed on a Web server). The method of the present invention begins when the compiler is initially invoked to compile these source file(s) into a set of binary files (e.g., Java.class files). The compilation process includes parsing the source files, applying type attribution, and generating binary code (e.g., Java bytecode) as previously described. The result of the compilation process is that the source files (e.g., .java files) have been translated into machine-readable binary code (e.g., .class files) which may then be executed on a Java virtual machine. As part of this compilation process, at step 901 the repository of the system of the present invention is populated with information regarding relationships between classes (i.e., class relationships) of the program. In addition, the browser context is obtained for the current (or central) class which is currently being viewed or edited.

At step 902, a user (e.g., a developer) requests a UML view of the program. For example, a developer creating or modifying source code for a given portion of a program (e.g., a particular class of a Java program) may request a UML view by selecting a UML file view tab provided in the visual development system of the currently preferred embodiment. At step 903, the current (or central) class is identified from the browser context.

At step 904, class relationships of the current (central) class are enumerated from the repository. Information regarding all relationships between the current class and other classes are generated from the repository. In this discussion, a source file containing a single class is used as an example to illustrate the operations of the present invention. However, a given source file, when compiled, may generate more than one binary file (e.g., several .class files). In the case of a source file containing multiple classes, information regarding each of the classes in the current source file is enumerated from the repository. In this situation the end user may select from these classes using tabs in the UML diagram that is generated by the system.

At step 905, the class relationship information generated at step 904 is used to build the model. In building the model, certain duplicative information is eliminated. In the currently preferred embodiment, the starting set or group of dependencies includes all dependencies between the selected current class and other classes of the program. However, as the model is complete, classes that are superclasses (including interfaces), associations, and subclasses are removed from the set of dependencies as these are all special types of dependencies that will be displayed in other regions of the UML diagram to be generated. For example, if a particular class is a superclass, then this class is included in the "Superclasses" set and it is removed from the "Dependencies" set. This is an additional processing step designed to remove duplicative information and simplify the UML diagram to be displayed. It should be noted that if a particular class is, for example, both a subclass and an association of the current class, then it is listed in both of the "Subclasses" and "Associations" sets, and will typically be displayed in both corresponding regions on the diagram in the currently preferred embodiment. However, this particular class will not be included in the final "Dependencies" set because it is already included in these other sets.

At step 906, a UML graphic representation is manifest using UML notation. In this step 906, a UML diagram graphic is generated for display via the user interface from the in-memory model built during step 905. At step 907, the graphical representation is post-processed to organize and consolidate the UML diagram information. This post-processing step currently includes grouping classes based on package, and applying color-coding and/or package highlighting to provide additional information to the developer viewing the UML diagram. Horizontal and vertical orientation is also applied to regions of the UML diagram to enable better presentation of the information in the user interface. At step 908, the UML diagram is displayed to the user via the user interface of the system.

At step 909, the user may select any of the elements displayed on the UML diagram to navigate to such elements using the system's UML browser. If a particular element is selected by the user, the selected element is then considered to be the central (or current) class and steps 903 to 908 may be repeated. As a result, a UML diagram is generated displaying the selected class in the center of the diagram and other related classes surrounding the center class as previously described. The user may then continue to work interactively, as desired.

G. Additional Viewing and Navigation Options

During the process of interacting with the system, the user may utilize a number of different viewing options from time to time. For instance, the user may elect to view the source code of a particular class, in which case the user may exit the UML diagram and view the source code of the selected class. In the currently preferred embodiment, a user may also select a source view tab or option to review the source code of a selected class. Browser navigation can be used to navigate between different views of a given program. For instance, a user may utilize "Forward" and "Back" buttons to go back and forth between UML diagrams or to navigate from a UML diagram to the source code of a particular class (or vice versa). A user may also invoke other actions on members of the UML diagram using the UML browser, if desired. For example, a user may select a class in the UML diagram and invoke a rename refactoring using a refactoring option provided in the currently preferred embodiment.

In the currently preferred embodiment, a user may select alternative views of the information provided in the UML diagram. A "structure view" option or "structure pane" may be selected to obtain a view of the raw information used to generate the UML diagram. As previously described and illustrated at FIG. 8B, the structure pane provides a condensed view of the raw information without filtering. As such the structure view may contain certain details from the model that are not typically included in the UML diagram. The structure pane provides a tree view of the components of the UML diagram showing the hierarchy or structure of elements of the UML diagram. The structure pane may also be used for navigation to a particular class, or its methods or members, in the source code in a manner similar to that described above for the UML diagram.

While the invention is described in some detail with specific reference to a single-preferred embodiment and certain alternatives, there is no intent to limit the invention to that particular embodiment or those specific alternatives. For instance, the foregoing discussion uses the Java programming language to illustrate the operations of the present invention. However, Java is only one of the possible programming languages with which the present invention may be advantageously utilized. Accordingly, the references to using the present invention with the Java language are for purposes of illustration and not limitation. Those skilled in the art will appreciate that modifications may be made to the preferred embodiment without departing from the teachings of the present invention.

What is claimed is:

1. In a development system, a method for generating a Unified Modeling Language (UML) diagram of a program for display in a graphical user interface of the system, said program containing a plurality of files, the method comprising:

determining relationships between files of said program;

upon receiving a request for display of a Unified Modeling Language (UML) diagram from a user, determining a file of said program currently displayed in the graphical user interface;

generating a UML diagram of the currently displayed file based upon said relationships between files, the UML diagram comprising a hierarchical view of relationships between the current file and other files of said program having a plurality of nodes; and displaying the UML diagram in the graphical user interface, the UML diagram enabling a user to navigate to a particular file of the program by selecting one of the nodes.

2. The method of claim 1, wherein said step of determining relationships between files includes determining relationships using a compiler.

3. The method of claim 1, wherein said step of determining relationships between files includes determining relationships between source code files of a Java software program.

4. The method of claim 1, wherein said step of determining relationships between files includes populating a repository with relationship information generated during compilation of said program.

5. The method of claim 4, wherein said relationship information includes dependencies between source code files of said program.

6. The method of claim 4, wherein said step of generating a UML diagram includes enumerating relationship information from the repository.

7. The method of claim 1, wherein said relationships between files include a selected one of dependency, association, inheritance, superclass, and subclass.

8. The method of claim 1, wherein said step of generating a UML diagram includes providing an automatic layout for the UML diagram.

9. The method of claim 1, wherein said step of generating a UML diagram includes eliminating redundant information.

10. The method of claim 1, wherein said step of generating a UML diagram includes grouping relationship information based upon relationship type.

11. The method of claim 1, wherein said step of displaying a UML diagram includes splitting the diagram into a plurality of regions for display in the user interface, said regions based upon relationship type.

12. The method of claim 1, wherein said step of displaying a UML diagram includes displaying files of said program grouped by package.

13. The method of claim 1, wherein said step of displaying a UML diagram includes displaying multiple relationships with files having more than one relationship with the current file.

14. The method of claim 1, wherein said step of displaying a UML diagram includes utilizing a predefined order for presentation of nodes of the UML diagram.

15. The method of claim 1, wherein said step of displaying a UML diagram includes color-coding the UML diagram to aid a user in understanding the relationship information.

16. The method of claim 1, further comprising:

in response to a user selecting a node of the UML diagram in the graphical user interface, automatically generating a UML diagram centered on the selected node.

17. The method of claim 1, further comprising:

in response to a user selecting a node of the UML diagram in the graphical user interface, displaying source code of the file in the selected node.

18. A computer-readable medium having computer-executable instructions for performing the method of claim 1.

19. A downloadable set of computer-executable instructions for performing the method of claim 1.

20. A system for displaying diagrams of software programs in a browser interface, said diagrams being displayed using Unified Modeling Language (UML) notation, the system comprising:

a compiler for compiling a software program containing a plurality of objects and generating information regarding relationships amongst said plurality of objects;

a manager module for receiving a request for a diagram of a particular object of the program and generating a diagram of relationships between said particular object and other objects of the program based upon the relationship information generated by the compiler, said diagram using Unified Modeling Language (UML) notation; and a browser interface for display of said diagram, said browser interface enabling a user to navigate to a particular object displayed in said diagram by selecting said particular object in the diagram.

21. The system of claim 20, wherein said compiler generates information regarding dependencies between components of a Java software program.

22. The system of claim 20, wherein said relationships between objects include a selected one of dependency, association, inheritance, superclass, and subclass.

23. The system of claim 20, wherein said compiler module stores the relationship information in a repository.

24. The system of claim 20, further comprising:

a model for automatically providing a structured layout for objects to be displayed in said diagram.

25. The system of claim 20, wherein said manager module automatically generates said diagram when requested by a user.

26. The system of claim 20, wherein said browser interface includes navigation buttons allowing a user to navigate forward and backward to view objects previously selected in the diagram.

27. The system of claim 20, further comprising:

user-configurable filters for removing redundant items of information from the diagram.

28. The system of claim 20, wherein said browser interface includes a structure pane for displaying a hierarchical view of objects displayed in the diagram.

29. The system of claim 20, further comprising:

navigation buttons enabling a user to navigate among objects displayed in the browser interface.

30. The system of claim 20, further comprising:

at least one viewer allowing a user to view source code of objects displayed in the browser interface.

31. The system of claim 30, wherein said at least one viewer comprises a source code editor allowing a user to modify the source code.

32. The system of claim 20, further comprising:

navigation buttons allowing a user to view UML diagrams of objects displayed in the browser interface.

33. The system of claim 20, wherein said browser interface enables a user to navigate to components of the program through an interconnected UML diagram.

34. A method for compiler-assisted generation of a diagram of dependencies between components of a software system, the method comprising:

determining dependencies between components of a software system using a compiler;

in response to request from a user for dependencies relating to a given component of the software system, identifying those components of the software system having dependencies with the given component; and automatically generating a diagram displaying dependencies between the given component and other components of the software system in a graphical user interface, said diagram connecting the given component and other components so that a user can navigate among components of the diagram.

35. The method of claim 34, wherein said software system comprises a Java software program.

36. The method of claim 34, wherein said dependencies between components comprises information about Java classes and class relationships.

37. The method of claim 34, further comprising:

using color-coding to assist a user in understanding dependencies between components.

38. The method of claim 34, wherein said step of automatically generating a diagram includes sorting dependency information to be displayed in the diagram.

39. The method of claim 34, wherein said step of automatically generating a diagram includes using a predefined order for presentation of components of the diagram.

40. The method of claim 39, wherein said predefined order includes grouping Java packages by dependency type.

41. The method of claim 39, wherein said predefined order includes ordering Java packages within a group by name.

42. The method of claim 39, wherein said predefined order includes ordering Java classes within a package by name.

43. The method of claim 34, wherein said step of automatically generating a diagram includes line routing with shared line segments for readability of the diagram.

44. The method of claim 34, wherein said step of automatically generating a diagram includes line routing without crossing lines.

45. The method of claim 34, wherein said step of automatically generating a diagram includes using Uniform Modeling Language (UML) notation.

46. The method of claim 34, further comprising:

in response to a user selecting a component displayed on the diagram in the graphical user interface, automatically generating a diagram centered on the selected component.

47. The method of claim 34, further comprising:

in response to a user selecting a component on the diagram in the graphical user interface, displaying source code of the component.

48. A downloadable set of computer-executable instructions for performing the method of claim 34.

49. A computer-readable medium having computer-executable instructions for performing the method of claim 34.

* * * * *